(12) United States Patent
Laurenti et al.

(10) Patent No.: US 6,795,930 B1
(45) Date of Patent: Sep. 21, 2004

(54) MICROPROCESSOR WITH SELECTED PARTITIONS DISABLED DURING BLOCK REPEAT

(75) Inventors: Gilbert Laurenti, St. Paul de Vence (FR); Olivier Morchipont, Juan les Pins (FR); Laurent Ichard, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 531 days.

(21) Appl. No.: 09/716,645

(22) Filed: Nov. 20, 2000

(51) Int. Cl.$^7$ .............................. G06F 1/26; G06F 9/30; G06F 9/44
(52) U.S. Cl. ...................... 713/324; 712/208; 712/241
(58) Field of Search ................................ 713/324, 323, 713/320, 208, 241

(56) References Cited

U.S. PATENT DOCUMENTS

| | | | | |
|---|---|---|---|---|
| 4,975,839 A | * | 12/1990 | Nakatsuka et al. | 712/211 |
| 5,167,024 A | | 11/1992 | Smith et al. | 395/375 |
| 5,185,868 A | * | 2/1993 | Tran | 712/217 |
| 5,276,889 A | | 1/1994 | Shiraishi et al. | 395/750 |
| 5,392,437 A | | 2/1995 | Matter et al. | 395/750 |
| 5,495,617 A | * | 2/1996 | Yamada | 713/323 |
| 5,603,037 A | | 2/1997 | Aybay | 395/750 |
| 5,742,781 A | | 4/1998 | Bajwa | 395/384 |
| 5,754,436 A | | 5/1998 | Walsh et al. | 364/483 |
| 5,790,877 A | * | 8/1998 | Nishiyama et al. | 713/323 |
| 5,880,981 A | | 3/1999 | Kojima et al. | 364/736.02 |
| 5,887,179 A | * | 3/1999 | Halahmi et al. | 713/324 |
| 5,996,083 A | | 11/1999 | Gupta et al. | 713/322 |
| 6,219,796 B1 | * | 4/2001 | Bartley | 713/320 |
| 6,307,281 B1 | * | 10/2001 | Houston | 307/31 |

FOREIGN PATENT DOCUMENTS

| | | | | |
|---|---|---|---|---|
| EP | 0 451 661 A | | 10/1991 | G06F/9/38 |
| EP | 0 562 885 A | | 9/1993 | G06F/1/32 |
| EP | 0 992 894 A | | 4/2000 | G06F/9/38 |
| JP | 07311758 A | * | 11/1995 | G06F/15/78 |
| WO | WO 97 36228 A | | 10/1997 | |
| WO | WO 98 06040 A | | 2/1998 | |

OTHER PUBLICATIONS

Brennan et al, Low Power Methology and Design Techniques for Processor Design, 1998, IBM Microelectronics, pp. 268–273.*

Texas Instruments Incorporated, TI–27684, *Processor With Local Instruction Looping*, Pending patent app. Ser. No. 09/410,867, filed Oct. 1, 1999.

* cited by examiner

Primary Examiner—Thomas Lee
Assistant Examiner—Suresh K Suryawanshi

(57) ABSTRACT

A microprocessor and a method of operating the microprocessor are provided in which a portion of the microprocessor is partitioned into a plurality of partitions. A sequence of instructions is executed within an instruction pipeline of the microprocessor. A block of instructions within the sequence of instructions is repetitively executed in response to a local repeat instruction. Either prior to executing the block of instructions, or during the first iteration of the loop, a determination is made that at least one of the plurality of partitions is not needed to execute the block of instructions. Operation of the at least one identified partition is inhibited during the repetitive execution of the block of instructions in order to reduce power dissipation.

25 Claims, 14 Drawing Sheets

MICROPROCESSOR WITH SELECTED PARTITIONS DISABLED DURING BLOCK REPEAT

FIELD OF THE INVENTION

The present invention relates to digital microprocessors, and in particular but not exclusively, to microprocessors configurable to repeat program flow.

BACKGROUND OF THE INVENTION

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

In a DSP or microprocessor, machine-readable instructions stored in a program memory are sequentially executed by the processor in order for the processor to perform operations or functions. The sequence of machine-readable instructions is termed a "program". Although the program instructions are typically performed sequentially, certain instructions permit the program sequence to be broken, and for the program flow to repeat a block of instructions. Such repetition of a block of instructions is known as "looping," and the block of instructions are known as a "loop" or a "block."

In order to reduce power consumption, many microprocessors provide a low power mode in which the clock is slowed during times of inactivity, or certain peripheral devices are turned off when not needed. The processor may enter an "idle" mode or a "sleep" mode until an interrupt occurs to restart full operation.

The present invention is directed to further reducing power consumption by microprocessors such as, for example but not exclusively, digital signal processors.

SUMMARY OF THE INVENTION

Aspects of the invention are specified in the claims. In accordance with a first aspect of the invention there is provided a method for operating a digital system that includes a microprocessor. A portion of the microprocessor is partitioned into a plurality of partitions. The microprocessor executes a sequence of instructions within an instruction pipeline of the microprocessor, and repetitively executes a block of instructions within the sequence of instructions. It is determined that at least one of the plurality of partitions is not needed to execute the block of instructions. In order to reduce power dissipation, operation of the unneeded partition(s) is inhibited while the block of instructions is repetitively executed.

In accordance with a second aspect of the invention, a repeat profile parameter is provided which is indicative of the partition(s) not needed to execute of the block of instructions.

In accordance with another aspect of the invention, the repeat profile parameter is provided by an instruction executed prior to the block of instructions.

In accordance with another aspect of the invention, the repeat profile parameter is determined by monitoring execution of a first iteration of the block of instructions and thereby deriving the repeat profile parameter.

In accordance with another aspect of the invention, separate repeat profile parameters are provided for an inner loop and an outer loop.

In accordance with another aspect of the invention, an interrupt during execution of the block of instructions causes masking of the partition inhibition so that all partitions of the microprocessor are enabled during execution of the ISR and unmasking of partition inhibition when returning to repetitive execution of the block of instructions after execution of the ISR is completed.

In accordance with other aspects of the invention, various portions of the microprocessor can be partitioned and partially inhibited during execution of a block of instructions. For example, the instruction decoder is partitioned according to groups -of instructions. The instruction register is partitioned according to various instruction lengths. The instruction pipeline is partitioned according to parallel instruction execution. A portion of the microprocessor is partitioned according to data types. Address generation circuitry is partitioned according to address modes. Status circuitry is inhibited if not required during execution of the block of instructions.

In another aspect of the invention there is provided a method for assembling a source code program to create a sequence of instructions, wherein the sequence of instructions has a repeatable block of instructions including an initial instruction and a final instruction. An instruction table is created with an entry for each instruction executable by a selected microprocessor, such that the entry for each instruction includes a group pattern defining a group of instructions that includes that instruction. The source code is transformed into a sequence of instructions, and the initial instruction and the final instruction is determined for a repeatable block of instructions associated with a prologue instruction. A plurality of group patterns selected from the instruction table representative of each instruction in the block of instructions is combined to form a repeat profile parameter, and the repeat profile parameter is associated with the prologue instruction in the sequence of instructions.

In accordance with an aspect of the present invention, partitioning of the instruction decoder for several instruction groups allows one or more of the decoder partitions to remain idle during execution of an instruction loop. Consequently, there is a corresponding reduction in power consumption by the microprocessor.

Therefore, embodiments of the invention are particularly suitable for use in portable apparatus, such as wireless communication devices. Typically such a wireless communication device comprise a user interface including a display such as liquid crystal display or a TFT display, and a keypad or keyboard for inputting data to the communications device. Additionally, a wireless communication device will also comprise an antenna for wireless communication with a radio telephone network or the like.

BRIEF DESCRIPTION OF THE DRAWINGS

Particular embodiments in accordance with the invention will now be described, by way of example only, and with reference to the accompanying drawings in which like reference signs are used to denote like parts unless otherwise stated, in which the Figures relate to the processor of FIG. 1 unless otherwise stated, and in which.

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of microprocessors.

Figure 1:
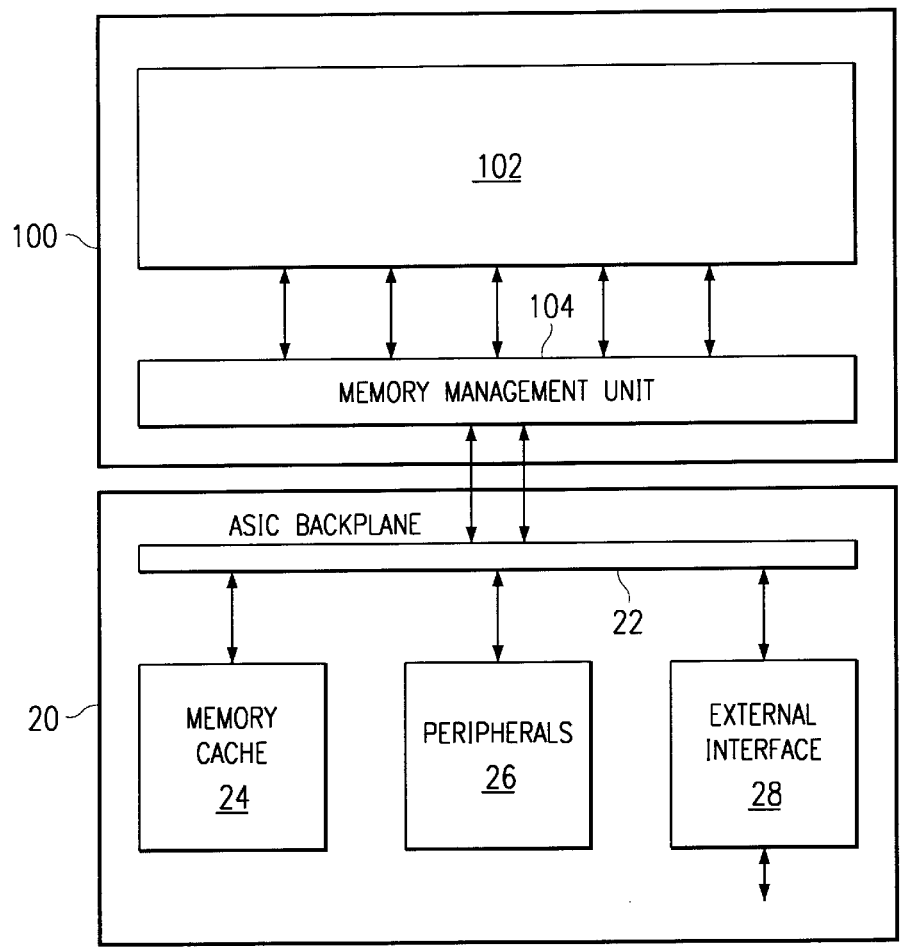
FIG. 1 is a schematic block diagram of a processor in accordance with an embodiment of the invention.

FIG. 1 is a block diagram of a microprocessor 10 that has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

In accordance with an aspect of the present invention, partitioning of a portion of the processor allows one or more of the partitions to remain idle during execution of an instruction loop. Consequently, there is a corresponding reduction in power consumption by the microprocessor. Therefore, embodiments of the invention are particularly suitable for use in portable apparatus, such as wireless communication devices. Several example systems that can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to reduce power consumption can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 2:
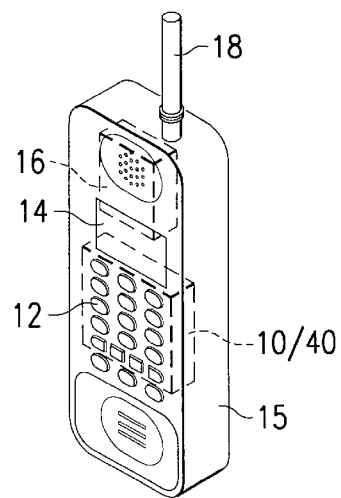
FIG. 2 is a schematic illustration of a wireless communication device suitable for incorporating in an embodiment of the invention.

FIG. 2 illustrates an exemplary implementation of a digital system embodying aspects of the present invention in a mobile telecommunications device, such as a mobile telephone with integrated keyboard 12 and display 14. Digital signal processor 10 embodying aspects of the present invention packaged in an integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Integrated circuit 40 includes a plurality of contacts for surface mounting. However, the integrated circuit could include other configurations, for example a plurality of pins on a lower surface of the circuit for mounting in a zero insertion force socket, or indeed any other suitable configuration.

A description of various architectural features and a description of a complete set of instructions of the microprocessor of FIG. 1 is provided in co-assigned application Ser. No. 09/410,977, now U.S. Pat. No. 6,658,578, which is incorporated herein by reference.

The basic architecture of an example of a processor according to the invention will now be described.

Referring again to FIG. 1, microprocessor 10 includes a central processing unit (CPU) 100 and a processor backplane 20. In the present embodiment, the processor is a Digital Signal Processor (DSP) implemented in an Application Specific Integrated Circuit (ASIC).

As shown in FIG. 1, central processing unit 100 includes a processor core 102 and a memory interface, or management, unit 104 for interfacing the processor core 102 with memory units external to the processor core.

Processor backplane 20 comprises a backplane bus 22, to which the memory management unit 104 of the microprocessor is connected. Also connected to the backplane bus 22 is an instruction cache memory 24, peripheral devices 26 and an external interface 28.

It will be appreciated that in other embodiments, the invention could be implemented using different configurations and/or different technologies. For example, CPU 100 alone could form processor 10, with processor backplane 20 being separate therefrom. CPU 100 could, for example be a DSP separate from and mounted on a backplane 20 supporting a backplane bus 22, peripheral and external interfaces. Microprocessor 100 could, for example, be a microprocessor other than a DSP and could be implemented in technologies other than ASIC technology. The microprocessor, or a processor including the processing engine, could be implemented in one or more integrated circuits.

Figure 3:
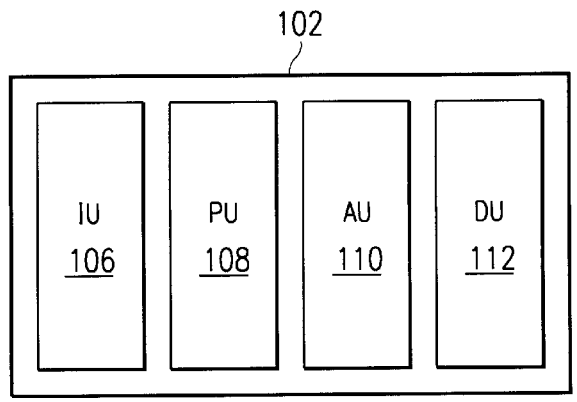
FIG. 3 is a schematic diagram of a core of the processor.

FIG. 3 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 4:
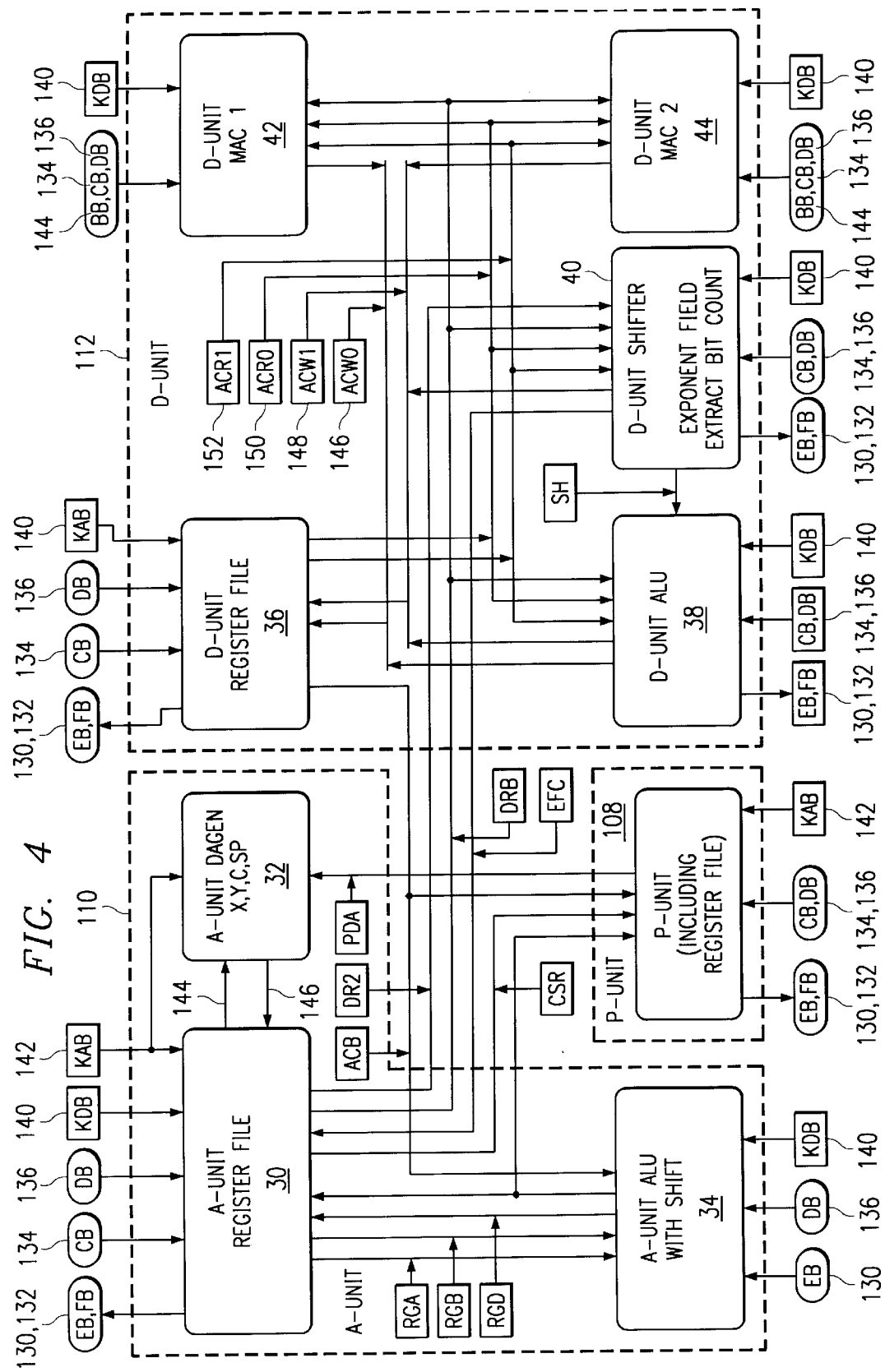
FIG. 4 is a more detailed schematic block diagram of various execution units of the core of the processor.

FIG. 4 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 4, in the present embodiment, the A Unit 110 includes a register file 30, a data address generation sub-unit (DAGEN) 32 and an Arithmetic and Logic Unit (ALU) 34. The A Unit register file 30 includes various registers, among which are 16-bit pointer registers (AR0–AR7) and data registers (DR0–DR3) which may also be used for data flow as well as address generation. Additionally, the register file includes 16-bit circular buffer registers and 7-bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16-bit X/Y registers and coefficient and stack pointer registers, for example for controlling and monitoring address generation within microprocessor 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16-bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 5:
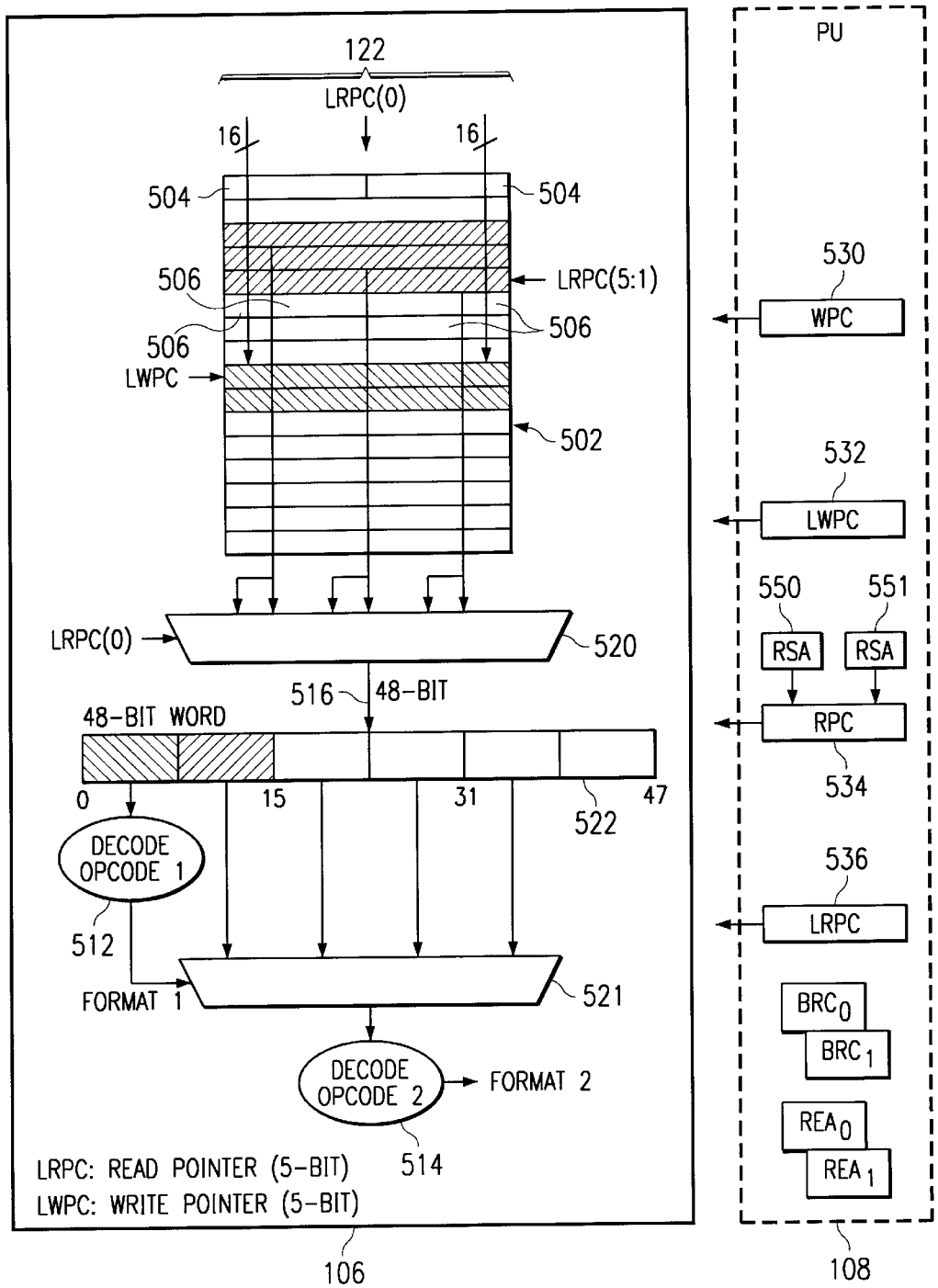
FIG. 5 is schematic diagram of an instruction buffer queue and an instruction decoder controller of the processor.

Referring now to FIG. 5, there is illustrated an instruction buffer unit 106 comprising a 32 word instruction buffer queue (IBQ) 502. The IBQ 502 comprises 32×16-bit registers 504, logically divided into 8-bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next four bytes of instruction code for the pipeline. For each fetch into the IBQ, the next four bytes from the program memory are fetched regardless of instruction boundaries. The RPC 534 points to the address in program memory of the instruction currently being dispatched to the decoder(s) 512 and 514.

The instructions are formed into a 48-bit word and are loaded into instruction register 522 and thence to instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 10, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 6:
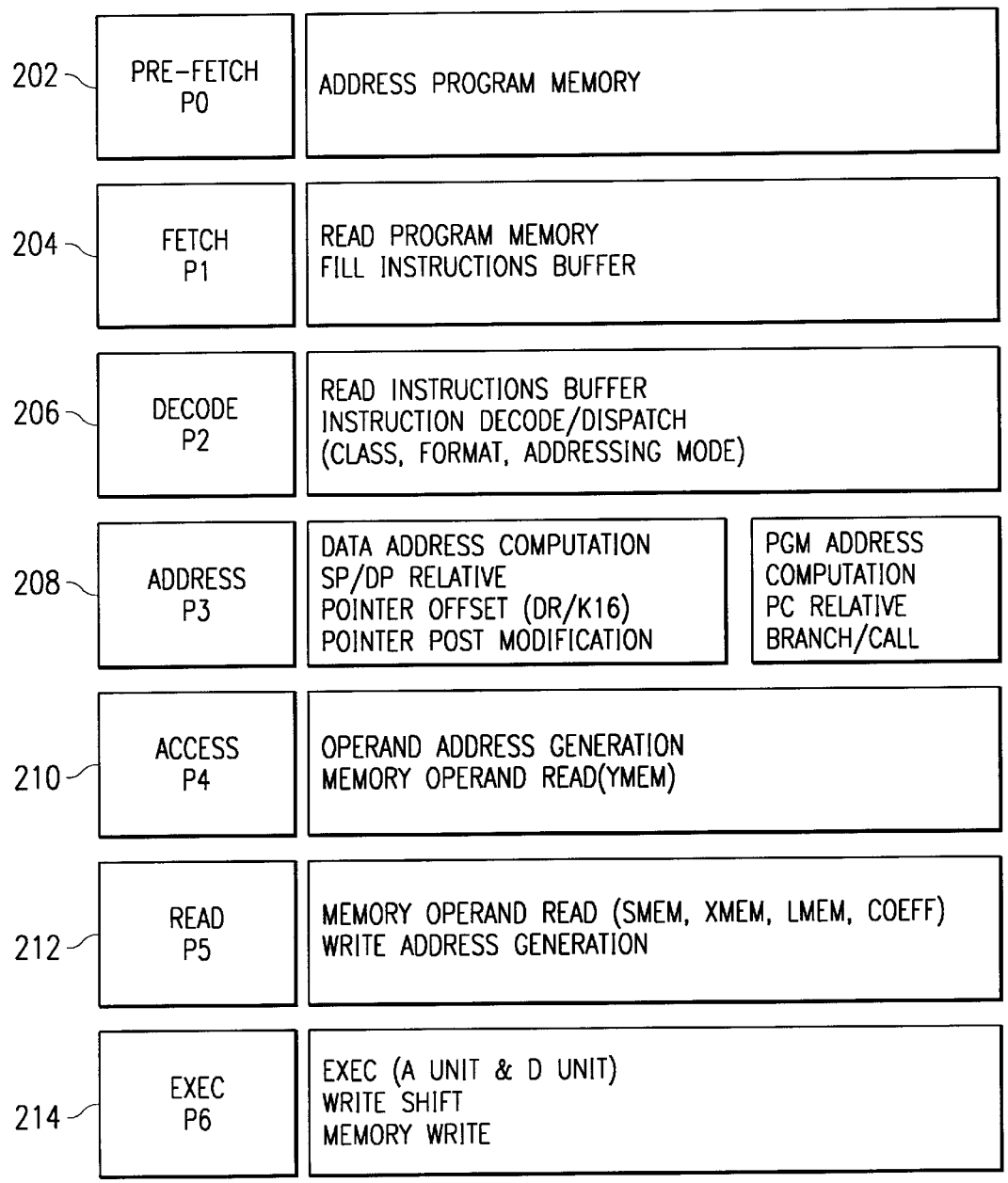
FIG. 6 is a representation of pipeline stages of the processor.

The processor core 102 executes instructions through a seven stage instruction execution pipeline, the respective stages of which will now be described with reference to FIG. 6.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 7:
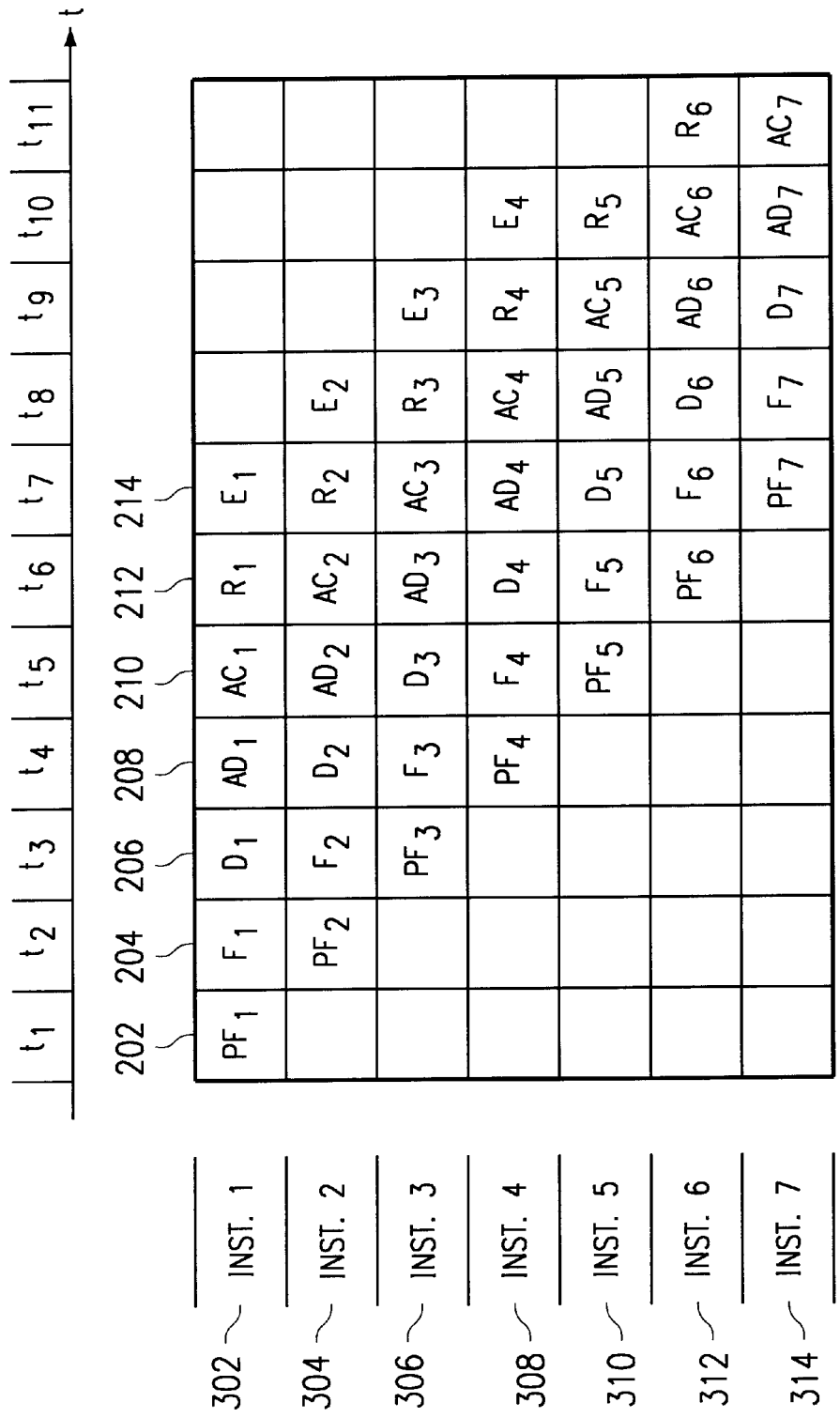
FIG. 7 is a diagrammatic illustration of an example of operation of a pipeline in the processor.

The basic principle of operation for a pipeline processor will now be described with reference to FIG. 7. As can be seen from FIG. 7, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 7 for a seven stage pipeline a total of seven instructions may be processed simultaneously. For all seven instructions 302–314, FIG. 7 shows them all under process in time period $T_7$. Such a structure adds a form of parallelism to the processing of instructions.

Figure 8:
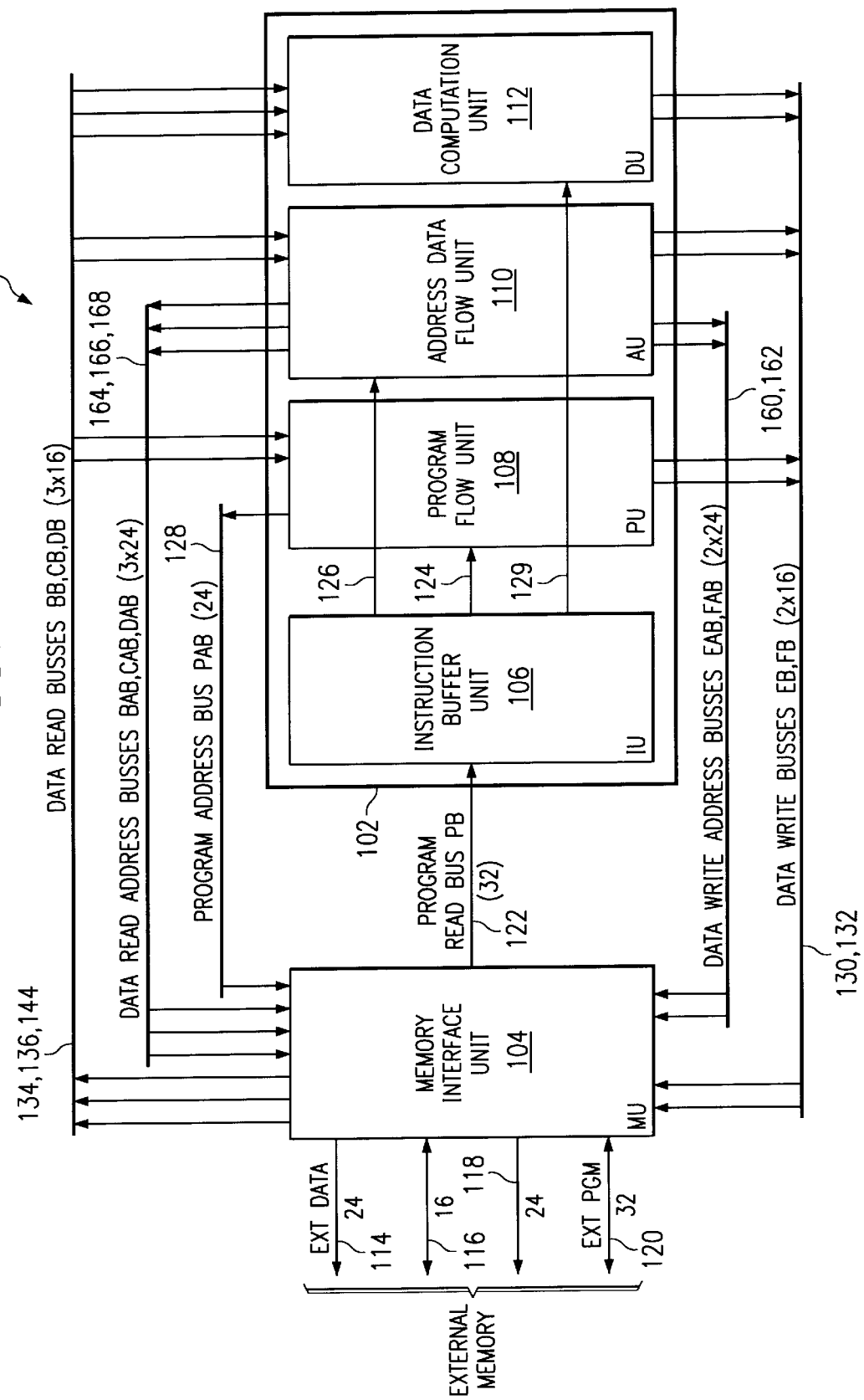
FIG. 8 is a schematic representation of the core of the processor for explaining the operation of the pipeline.

As shown in FIG. 8, the present embodiment of the invention includes a memory management unit 104 which is coupled to external memory units (not shown) via a 24-bit address bus 114 and a bi-directional 16-bit data bus 116. Additionally, the memory management unit 104 is coupled to program storage memory (not shown) via a 24-bit address bus 118 and a 32-bit bi-directional data bus 120. The memory management unit 104 is also coupled to the I Unit 106 of the machine processor core 102 via a 32-bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24-bit program address bus 128, the two 16-bit data write busses (EB, FB) 130, 132, and the two 16-bit data read busses (CB, DB) 134, 136. The A Unit 110 is coupled to the memory management unit 104 via two 24-bit data write address busses (EAB, FAB) 160, 162, the two 16-bit data write busses (EB, FB) 130, 132, the three data read address busses (BAB, CAB, DAB) 164, 166, 168 and the two 16-bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 8 represents the passing of instructions from the I Unit 106 to the P Unit 108 at 124, for forwarding branch instructions for example. Additionally, FIG. 8 represents the passing of data from the I Unit 106 to the A Unit 110 and the D Unit 112 at 126 and 129 respectively.

Various aspects of the processor are summarized in Table 1.

TABLE 1

Processor Summary

Very Low Power programmable processor
Parallel execution of instructions, 8-bit to 48-bit instruction format
Seven stage pipeline (including pre-fetch)

| | |
|---|---|
| Instruction buffer unit highlight | 32 × 16 buffer size<br>Parallel Instruction dispatching<br>Local Loop |
| Data computation unit highlight | Four 40-bit generic (accumulator) registers<br>Single cycle 17 × 17 Multiplication-Accumulation (MAC)<br>40-bit ALU, "32 + 8" or "(2 × 16) + 8"<br>Special processing hardware for Viterbi functions<br>Barrel shifter |
| Program flow unit highlight | 32-bits/cycle program fetch bandwidth<br>24-bit program address<br>Hardware loop controllers (zero overhead loops)<br>Interruptible repeat loop function<br>Bit field test for conditional jump<br>Reduced overhead for program flow control |
| Data flow unit highlight | Three address generators, with various addressing modes<br>Three 7-bit main data page registers<br>Two Index registers<br>Eight 16-bit pointers<br>Dedicated 16-bit coefficients pointer<br>Four 16-bit generic registers<br>Three independent circular buffers<br>Pointers & registers swap<br>16-bits ALU with shift |
| Memory Interface highlight | Three 16-bit operands per cycle<br>32-bit program fetch per cycle<br>Easy interface with cache memories |

C compiler
Algebraic assembler

The microprocessor is configured to respond to a local repeat instruction, which provides for an iterative looping through a block of instructions. The local repeat instruction is a 16-bit instruction and comprises: an op-code; parallel enable bit; and an offset (6 bits). The op-code defines the instruction as a local instruction, and prompts the microprocessor to expect the offset and op-code extension. In the described embodiment the offset has a maximum value of 55. However this does not mean that the loop size is limited to 55 bytes. Indeed, this offset indicates the difference between the block repeat end address and the start address with the start address being the address of the first instruction or pair of instructions and the end address being the address of the last instruction or last instruction of a pair of instructions. Therefore, the maximum loop size can be (55+"size of last instruction"), which is less than or equal to 61 bytes. In other embodiments, the offset and loop size may be either larger or smaller, in accordance with a different size instruction buffer queue, for example.

Referring again to FIG. 5, when the local loop instruction is decoded, the start address for the local loop, i.e. the address after the local loop instruction address, is stored in the Block Repeat Start Address$_0$ (RSA$_0$) register which is located, for example, in the P unit 108. After the initial pass through the loop, the Read Program Counter (RPC) is loaded with the contents of RSA$_0$ for re-entering the loop. The location of the last instruction of the local loop is computed using the offset, and the location is stored in the Block Repeat End Address$_0$ (REA$_0$) register which may also be located in the P unit 108, for example. Two repeat start address registers and two repeat end address registers (RSA$_0$ 550, RSA$_1$ 551, REA$_0$, REA$_1$) are provided for nested loops. For nesting levels greater than two, preceding start/end addresses are pushed to a stack register. In addition to these four registers, the block repeat control circuitry also includes two Block Repeat Count (BRC0/BRC1) registers and associated control circuitry.

Typically, DSP program code results in a significant amount of processor execution cycles resulting from intensive repetition of loops. In the present embodiment, most of these loops can be managed as a 'local repeat' where the code is directly executed from the instruction buffer and fetch from external memory is disabled. This will be described in more detail with reference to FIG. 18. Since these local repeat loops involve a limited number of instructions driven by the nature of the algorithm, there is an opportunity to selectively disable an entire functional unit or one or more partitions of a function unit or control circuitry in order to minimize power consumption. This can be done by profiling the block repeat body of instructions during the compile/assembly process or during the first iteration of the loop by monitoring circuitry within the microprocessor.

The microprocessor of the present embodiment of the invention has both a local repeat instruction and a general block repeat instruction for blocks which cannot fit entirely within the IBQ. Repeat loop profiling is associated with the local repeat instruction, since a large repeat block is less likely to use a limited set of hardware resources. However, aspects of the present invention are also useful in an embodiment which does not include a local repeat per se, but has just a general block repeat instruction, for example. In such an embodiment, a check can be done to determine block length and invoke repeat profiling only for short blocks, for example.

When the assembler performs profiling, a repeat profile parameter is formed based on the analysis of the instructions within the block and is attached to the local block repeat instruction as an immediate operand. Typically one extra byte is enough to specify the selected partitions which can be disabled.

When the monitoring hardware performs profiling, it is determined from the execution of the first iteration of a block of instructions the hardware resources required for executing that block of instructions. Then from the second to last iteration useless hardware and associated control decode logic can be disabled, or inhibited.

Figure 9:
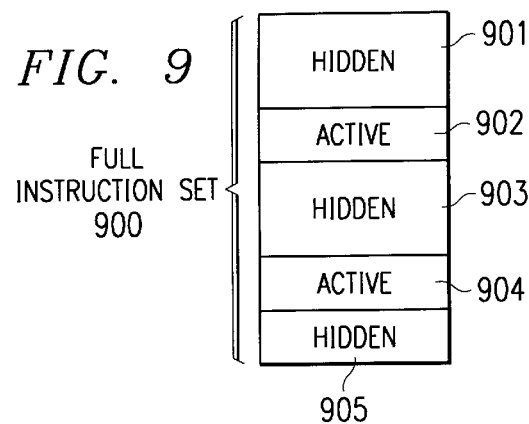
FIG. 9 is an illustration of grouping within an instruction set of the processor.

FIG. 9 is an illustration of grouping within an instruction set of the processor. An aspect of the present invention is that the instruction decoder can be partitioned into a number of partitions based on instruction groups. For example, in FIG. 9 there is illustrated an instruction set 900 with five instruction groups, 901–905. Depending on the instructions used within a repeat block, one or more of the instructions groups may not be represented. For example, during a first repeat loop, the block of instructions consist of instructions within only group 902 and 904. Instructions within groups 901, 903 and 905 are not used. Therefore, decode logic associated with these non-used instruction groups or addressing modes which don't need to be decoded can therefore be disabled during the iterative execution of this first block of instructions. A subsequent repeat loop may have a block of instruction in which different instruction groups are not represented. Different decode logic associated with these different non-used instruction groups can therefore be disabled during the iterative execution of the subsequent block of instructions. This scheme allows trade-off of a large DSP instruction set for encoding flexibility and code size optimization while keeping the dynamic instruction set seen by the decode hardware to a minimum.

Within the processor of the present embodiment of the invention, a set of control flow instructions are defined which are not allowed to be used within a repeat loop, including: goto, call, return, switch, intr (software interrupt), trap, reset, and idle. The control flow instructions that are inherently illegal in local repeat don't need to be decoded during execution of the loop. Therefore, by partitioning the instructions decode hardware to place this set of instruction in a separate partition, a significant amount of gates can be frozen during a local repeat loop execution regardless of the block repeat profile parameter.

For example, an alternate embodiment of the present invention does not provide support for a repeat profile parameter; however, power consumption is reduced by inhibiting operation of a partition of the instruction decoder corresponding to the inherently forbidden group of instructions during the step of repetitively executing the block of instructions while a remainder of the instruction decoder decodes the block of instructions as they are executed in the pipeline.

Table 2 illustrates instruction encoding for the repeat profile parameter that is appended to the local repeat instruction of the processor of the present embodiment.

TABLE 2

| Encoding for local repeat instruction with repeat profile parameter | | |
|---|---|---|
| Without profiling | localrepeat(16)<br>0000 000E 0011 1111 | 16 → block length in bytes |
| With profiling | localrepeat(16)<br>0000 000E 0011 1111<br>pppp pppp | Same algebraic syntax. The profile is not determined by the user but by the assembler |

As noted in Table 2, a person writing a program is not responsible for the repeat profile parameter. This parameter is determined by the assembler in the present embodiment, or by monitoring hardware in an alternative embodiment, without assistance or direction from the programmer.

One skilled in the art will recognize that other encodings can be used for a repeat instruction. In this embodiment, the repeat profile parameter is appended to the repeat local instruction. However, one skilled in the art will recognize that a repeat profile parameter may be appended to or associated with any instruction that acts as a prologue instruction for a repeat loop. For example, in another embodiment the repeat profile parameter is passed by a load instruction which is inserted in the machine-readable instruction stream by the assembler for execution prior to execution of the associated repeat loop.

Figure 10:
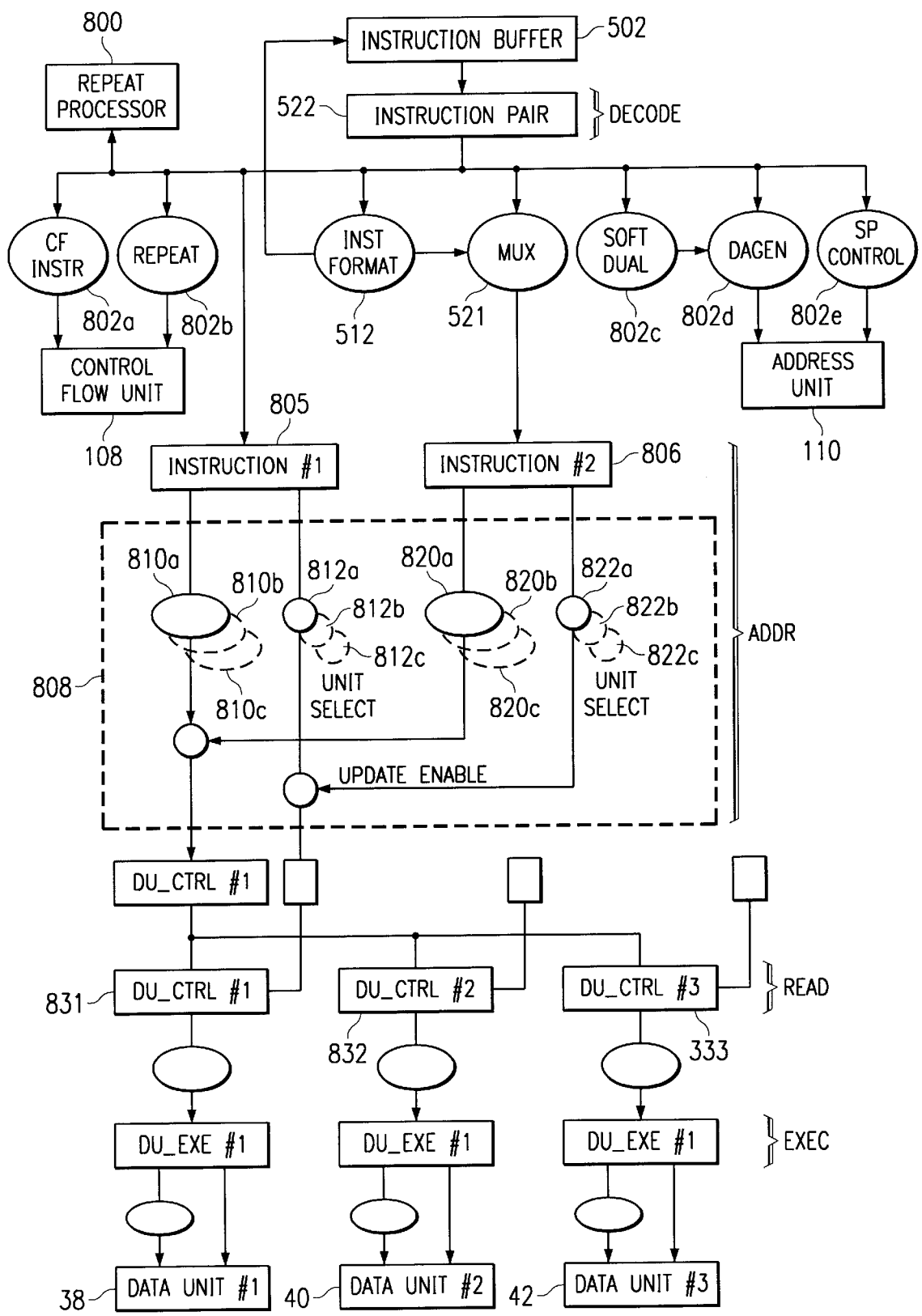
FIG. 10 is a block diagram illustrating the instruction execution pipeline of the processor in more detail, including partitions of the instruction decoder.

FIG. 10 is a block diagram illustrating the instruction execution pipeline of processor 100 in more detail, including partitions of the instruction decoder. The instruction decoder of the present embodiment is hierarchical. A first level of instruction decoding is associated with the DECODE pipeline stage and is represented by partitions 802a–e, and 512. A second level of instruction decoding is associated with the ADDRESS pipeline stage and is represented by instruction decoding hardware 808 having partitions 810a–c, 812a–c, 820a–c and 822a–c. Each instruction decoder partition is associated with an instruction group. The instruction groups illustrated in FIG. 9 and the partitions illustrated in FIG. 10 are simplified for illustrative purposes. Various embodiments of the invention may have more or fewer instruction groups and decoder partitions than herein illustrated.

As discussed earlier, an instruction pair is received into instruction register 522 and then decoded. The instruction format extracted by decoder 512 in the DECODE pipeline stage defines an instruction #1/instruction #2 boundary and controls mux 521. Instruction #1 and instruction #2 are then isolated by being loaded into separate instruction registers 805, 806 according to respective format in the ADDRESS stage. In the DECODE stage, control flow instruction are decoded by partition 802a, repeat instructions are decoded by partition 802b, soft dual instructions are decoded by partition 802c, address modes are decoded by partition 802d and stack pointer control instructions are decoded by partition 802e.

During the ADDRESS pipeline stage the second level instruction decoder 808 determines which Data Unit resources are required to process the instructions pair. Data units 38, 40 and 42 are presented for illustrative purposes. Various embodiments may have additional of fewer Data Units. Data Units that are determined to be useless for the current instructions pair execution are kept frozen in order to reduce power consumption. This is done by maintaining the previous data operand selection and previous operation control by gating clocks of control hardware 831, 832, and/or 833 so that signal transitions do not occur within the unneeded units. Local decode hardware associated with the unneeded unit in the READ pipeline stage is also kept frozen.

Advantageously, the local repeat profiling scheme allows anticipation of the data resources that are unneeded for a given loop execution and avoids decoding for each step if the current instruction opcode is within the group of instruction involving such unit. A repeat profile parameter provided as an immediate operand of a repeat local instruction is stored in a repeat profile register 800. Therefore, identified partitions within instruction decoder 808 are inhibited in response to the repeat profile parameter during repetitive execution of an associated loop.

Advantageously, the local repeat profiling scheme also allows freezing selected partitions of decode hardware in the DECODE pipeline stage. However, as discussed above, all the Control Flow instructions (goto, call . . . ) that are illegal within a local repeat body don't need to be decoded. Therefore, associated hardware in partition 802c can be frozen during the entire loop execution regardless of whether or not a repeat profile parameter is provided.

The profile can determine if the loop body includes nested local repeat or single repeat instructions. When there is no nesting, hardware partition 802b associated with 'local repeat & repeat' decode can be frozen during the entire loop execution.

The profile can determine if the loop body includes stack pointer related instructions (push( ), pop( ) . . . ). When there are no stack pointer related instructions, hardware partition 802e associated with 'push( )/pop( ) family' decode can be frozen during the entire loop execution.

The profile can determine if the loop body includes soft dual or built in dual instructions. The instruction extraction hardware and the Address Generator control can take advantage of this static configuration to reduce gate activity hardware partition 802c.

Figure 11:
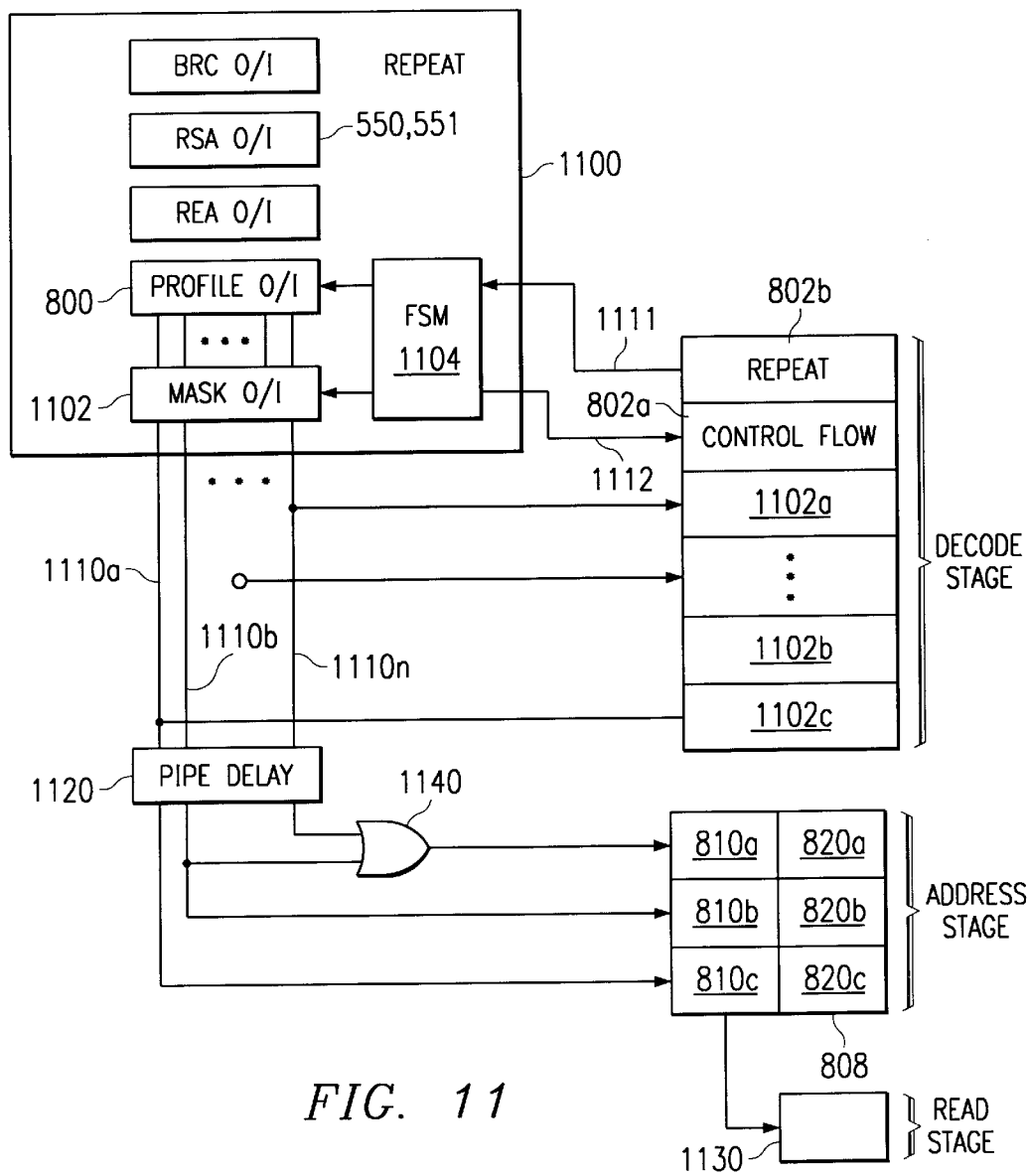
FIG. 11 is a block diagram illustrating the block repeat control circuitry of the processor in more detail, including a repeat profile register and mask.

FIG. 11 is a block diagram illustrating block repeat control circuitry 1100 of the processor in more detail, including repeat profile register 800 and a profile mask 1102. Repeat profile register 800 is loaded with a repeat profile parameter provided by a repeat local instruction. In case of loop nesting, two options are possible. In a first option, the profile is determined according to the resources needed by both the outer and the inner loops. In a second option, the outer loop and the inner loop have their own profiles and register 800 includes two registers that can be separately selected by a mux included in mask 1102, or by other means. The profiles are then managed as a stack by finite state machine (FSM) 1104. The profile is switched according to the active level of block repeat. This scheme provides a better granularity but requires some extra hardware.

The profile is masked by mask 1101 in response to FSM 1104 as soon as the local repeat of a block of instructions is completed, or in case the loop execution is interrupted. Upon return from interrupt service routine (ISR), the profile is unmasked and becomes active. This allows the full instruction set to be active during the ISR.

Still referring to FIG. 11, profile signals 1110a–n from mask circuitry 1102 are provided to various hardware partitions of the microprocessor in order to inhibit operation of selected partitions. For example, profile signal 1110a is provided to instruction decoder partition 1102c. Likewise, other profile signals from mask 1102 are provided to other partitions in the DECODE stage. Certain partitions, such as 1102b, need to remain enabled at all times and do not respond to profile signals. As discussed above, certain partitions, such as control flow partition 802a are disabled regardless of the profile parameter whenever a local loop is executed, as indicated by decode signal 1111 from decode partition 802b. Inhibit signal 1112 from FSM 1104 is asserted in response to decode signal 1111.

The decode hardware partitioning matches the granularity defined by the profile parameter bit. Inhibiting, or freezing, is handled by an extra signal input for the respective profile signal on a 1st stage of decode logic (extra gate or extra input). This freeze control can be seen as static signal for the duration of the loop execution. This avoids propagation through the logic of useless transitions or glitches. The profile information may be used on other embodiments to freeze D-flipflops (DFF's) or latches by clock control where in conventional design this may generate a speed path for gated clock enable signal.

Still referring to FIG. 11, pipe delay register 1120 maintains timing of the profile signals for ADDRESS stage partitions of decoder 808. A freeze performed in the ADDR stage will be propagated to read stage decoder partition 1130 without extra control. Also, various profile signals may be combined by logic gates, such as gate 1140, to create combinations and permutations of the profile signals to inhibit various hardware partitions.

Figure 12:
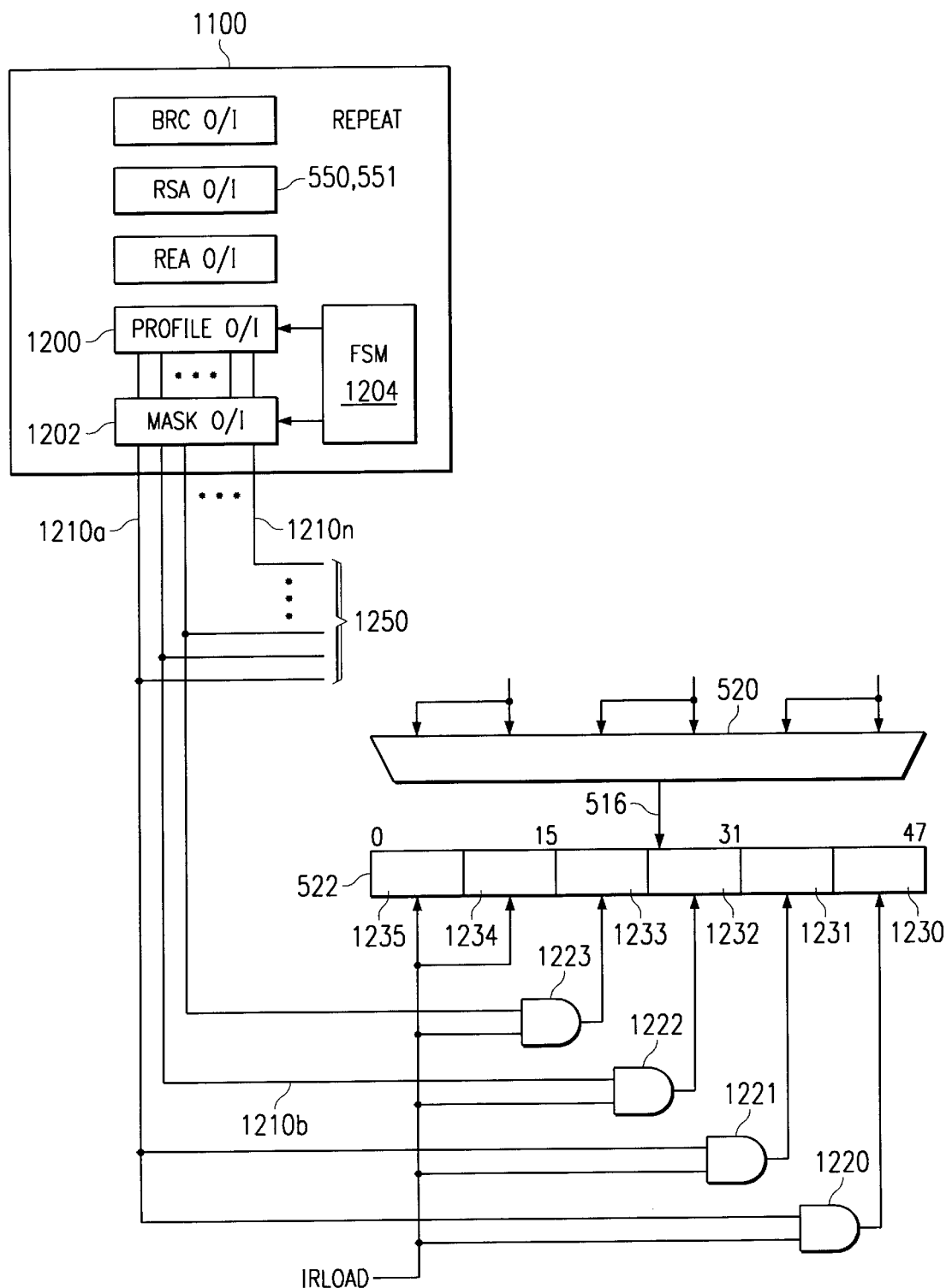
FIG. 12 is a block diagram of an another embodiment of the present invention illustrating the block repeat control circuitry of the processor in more detail, including an instruction register for variable size instruction words.

FIG. 12 is a block diagram of an another embodiment of the present invention illustrating the block repeat control circuitry of the processor in more detail, including instruction register 522 for variable size instruction words. Repeat profile register 1200 is loaded with a repeat profile parameter provided by a repeat local instruction. The profile is unmasked by mask 1202 in response to FSM 1204 as soon as execution of the local repeat of a block of instructions is started. The profile is masked by mask 1201 in response to FSM 1204 as soon as the local repeat of a block of instructions is completed, or in case the loop execution is interrupted.

A profile parameter stored in profile register 1200 can identify the maximum length instruction format in the loop body. The instruction register is partitioned into several partitions 1230–1235. The hardware can then selectively inhibit unneeded instruction register partition to adjust instruction register size accordingly. A clock signal IRLOAD loads instruction register 522 with a new instruction selected from the instruction buffer (see FIG. 5) by mux 520. Gates 1220–1223 each receive a profile signal from parameter register 1200 via mask 1202 that is combined with clock signal IRLOAD to inhibit loading of selected partitions of instruction register 522 during repetitive execution of a block of instructions. For example, if the maximum length of all instructions executed in a given block repeat is determined to be five bytes, then partition 1230 is inhibited by forming a repeat profile parameter which causes profile signal 1210a to be asserted low during execution of the given block such the clock signal IRLOAD is inhibited from passing through AND gate 1220, thereby inhibiting clocking of instruction register partition 1230. Likewise, if the maximum instruction format is determined to be four bytes, then profile signal 1210a and profile signal 1210b are both asserted low during repetitive execution of the associated block of instructions to inhibit clocking of partitions 1230 and 1231. Since a block will always have at least a two byte instruction, partitions 1234 and 1235 do not have inhibiting circuitry associated with them. One skilled in the art will realize that means other than an AND gate can be used to inhibit selected partitions in response to the repeat profile parameter.

Still referring to FIG. 12, in a similar manner, mux 520 can be partitioned and selected partitions inhibited in response to a maximum length instruction format indicated by the repeat profile parameter.

As noted in Table 2, an advantage of the present invention is that a person writing a program is not responsible for the repeat profile parameter. This parameter is determined by the assembler in the present embodiment, or by monitoring hardware in an alternative embodiment, without assistance or direction from the programmer. The embodiments of FIG. 11 and FIG. 12 may be combined so that a single repeat profile parameter inhibits selected partitions of an instruction decoder and also selected partitions of an instruction register by appropriate selection and connection of profile signals from the profile parameter register, as indicated at 1250.

Figure 13:
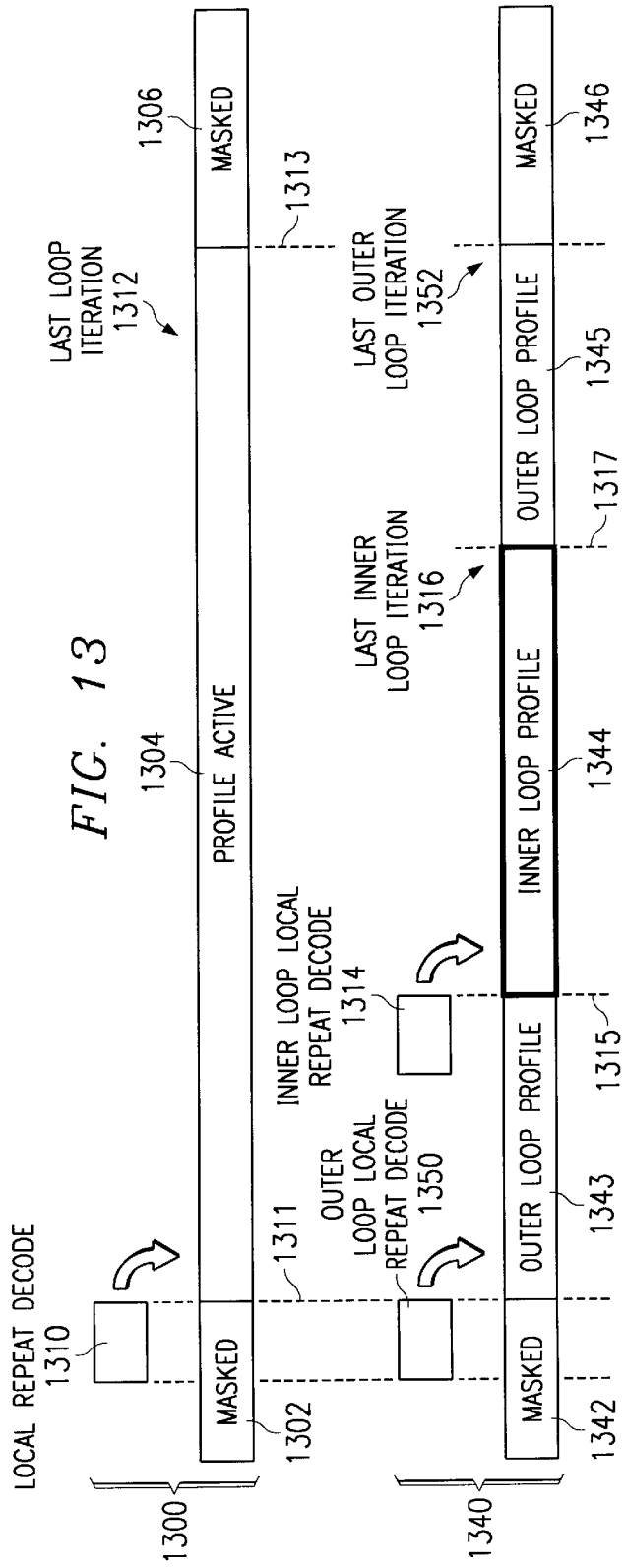
FIG. 13 is a timing diagram illustrating operation of repeat profiles during execution of a nested loop by the processor.

FIG. 13 is a timing diagram illustrating operation of processor 100 with two repeat loops in a nested loop. In case of nesting of loops, two options are possible: (1) a single composite profile is determined according to the resources needed by both the outer and inner loops, (2) the outer loop and inner loop each have their own profile. The profiles are then managed as stack. The profile is switched according to the active level of block repeat. The second option provides a better granularity but requires some extra hardware. Referring again to FIG. 11, two profile registers, PROFILE0 and PROFILE1 are included within 800 of the present embodiment. Mask 1102 includes MASK0 and MASK1. Muxing circuitry (not shown) within 1102 operates in response to FSM 1104 to provide the selected profile parameter on profile signals 1110a–n when one of them is unmasked.

Referring now to FIG. 13, timeline 1300 illustrates operation of profile signals 1110a–n (on FIG. 11) or 1210a–n (on FIG. 12) during a nested loop, using the first option. A composite repeat profile representative of both an inner and an outer loop is determined and stored in the profile register by a prologue instruction associated with the outer loop. As discussed earlier, the prologue instruction may be the loop instruction which is decoded during time slot 1310, or it may be a store instruction, for example. If the repeat instruction for the inner loop provides a profile parameter, it is ignored. The profile remains masked until time 1311 when the initial instruction of the block begins execution. The composite profile remains unmasked during the entire time 1304 of execution of the nested loops. During time 1312, the last iteration of the outer loop is performed. At time 1313, the final instruction of the last iteration is executed and the profile is again masked, as indicated at time slot 1306.

Timeline 1300 is also representative of the operation of a single block repeat in which case time slot 1304 represents iterative execution of the block of instructions and time slot 1312 represents the last iteration of the block of instructions.

Still referring to FIG. 13, timeline 1340 illustrates operation of profile signals 1110a–n (on FIG. 11) or 1210a–n (on FIG. 12) during a nested loop, using the second option. A first repeat profile representative of an outer loop is determined and stored in profile register PROFILE0 by a prologue instruction associated with the outer loop. A second repeat profile representative of an inner loop is determined and stored in profile register PROFILE1 by a prologue instruction associated with the inner loop. As discussed earlier, the prologue instructions may be the inner and outer loop instructions which are decoded during time slot 1350 and 1314, or they may be store instructions, for example. The profile remains masked until time 1311 when the initial instruction of the outer loop begins execution. The first profile remains unmasked during of execution of the outer loop, illustrated by time slots 1343 and 1345. At time 1315, the initial instruction of the inner loop begins execution and the second profile is selected by FSM 1104 during execution of the inner loop, illustrated by time slot 1344. As execution moves from inner loop to outer loop, and vice versa, the corresponding profile is selected by FSM 1104. Time line 1340 illustrates only a single iteration of the inner loop for clarity, but one skilled in the art realizes multiple iterations of the inner and outer loops typically occur. During time .1316, the last iteration of the inner loop is executed. During time 1352, the last iteration of the outer loop is performed. At time 1313, the final instruction of the last iteration is executed and the profile is again masked, as indicated at time slot 1346.

Figure 14:
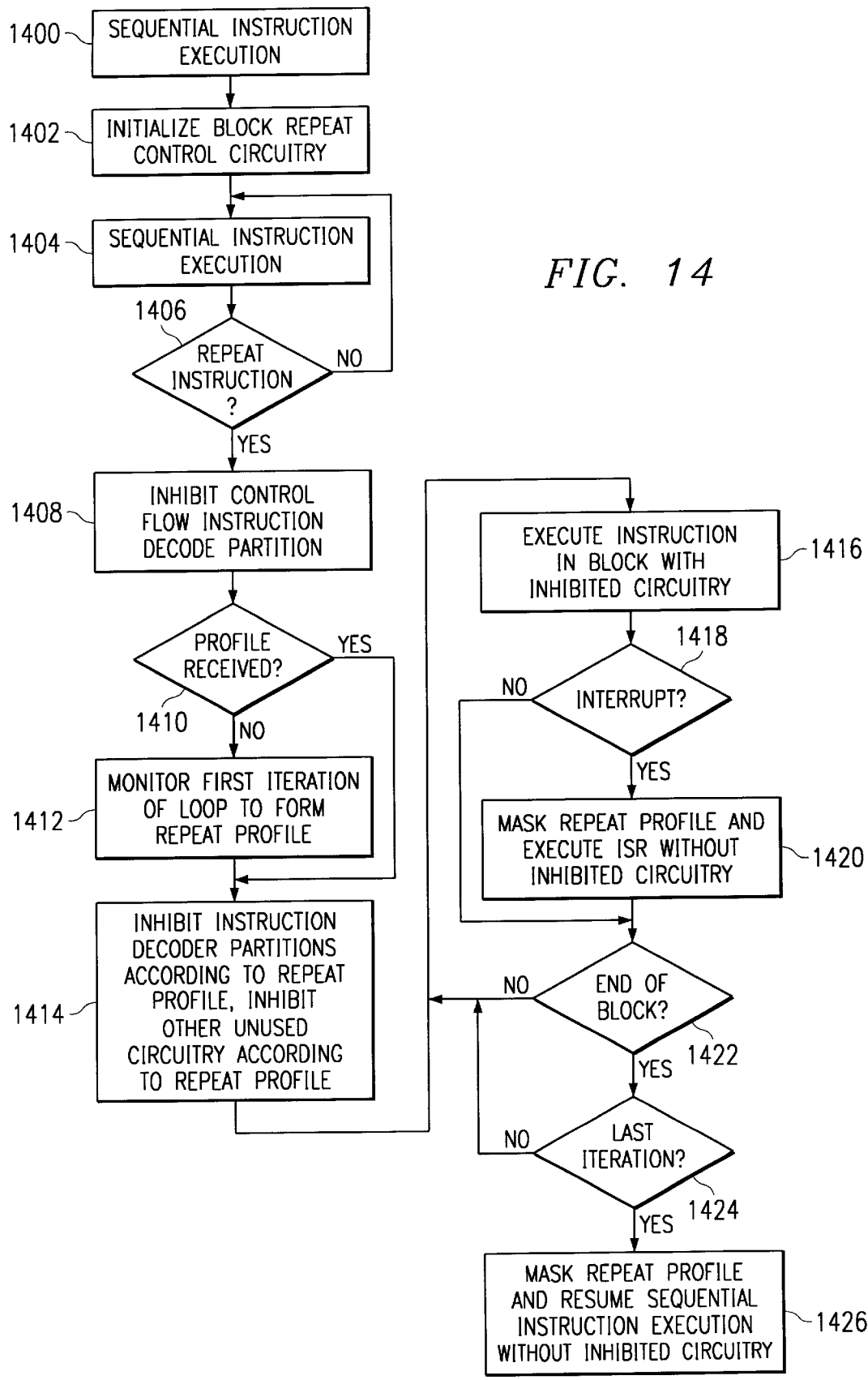
FIG. 14 is a flow chart illustrating various, steps involved in repetitively executing a block of instruction in the processor using a repeat profile parameter.

FIG. 14 is a flow chart illustrating various steps involved in repetitively executing a block of instruction in processor 100 using a repeat profile parameter. During step 1400, sequential execution of an instruction sequence is performed. It is to be understood that the term "sequential" may include jumps, branches, calls, returns, etc. During step 1402, block repeat control circuitry is initialized by prologue instructions associated with a pending loop. This includes, for example, loading a block repeat count register. This may also include loading a repeat profile register. During steps 1204 and 1206, sequential execution is performed until a repeat instruction is decoded. In a preferred embodiment, the repeat instruction provides a repeat profile parameter that is determined for the associated block of instructions that are to be repetitively executed. At step 1408, a partition of the instruction decoder corresponding to a group of instructions that are inherently prohibited during repetitive block execution is inhibited.

At step 1410, if a profile has not been received, then monitoring circuitry monitors execution of a first iteration of the block of instructions during step 1412 and determines which partitions of the processor are not needed for the remaining iterations. In either case, unneeded partitions of the instruction decoder are inhibited at step 1414, along with any other hardware partitions that have been determined to be unneeded for execution of the block of instructions. The block of instructions is executed by repetitively looping through steps 1416, 1418, and 1422. If an interrupt is detected in step 1418, then the profile is masked during execution of the ISR so that the ISR can be executed without inhibited circuitry. Upon return from the ISR, the profile is again unmasked and is active in inhibiting unused partitions.

Each complete iteration of the block of instructions is checked at step 1424. After the last iteration is completed, the profile is masked and sequential execution is resumed at step 1426 without inhibited circuitry partitions.

Figure 15:
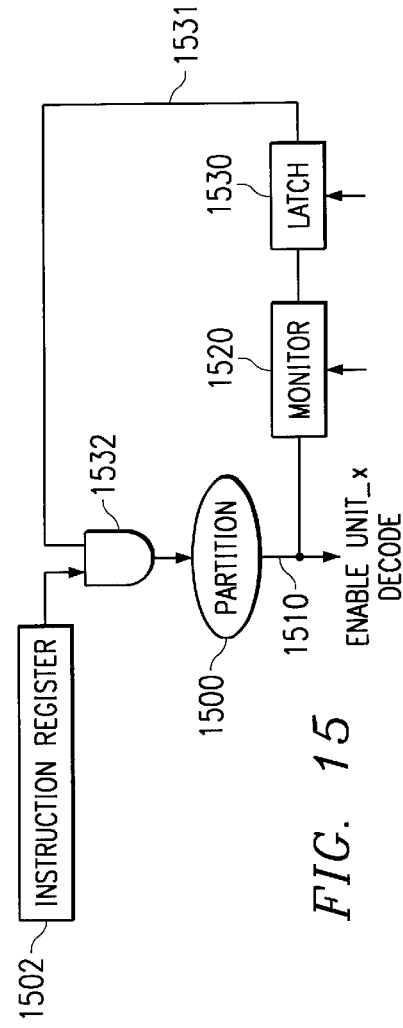
FIG. 15 is a block diagram illustrating monitoring circuitry for determining a profile during execution of a block of instructions by the processor.

FIG. 15 is a block diagram illustrating monitoring circuitry for determining a profile during execution of a block of instructions by processor 100. Circuitry 1500 represents a partition of a portion of the hardware of processor 100; which in the present embodiment is a partition of an instruction decoder, but in another embodiment may represent a partition of other portions of the processor, such as an instruction register, for example. Partition 1500 receives signals from an instruction register 1502 and provides one or more output signals 1510 representative of activity by partition 1500. Monitoring circuitry 1520 monitors signal(s) 1510 during a first iteration of the block of instructions. If partition 1500 is active during one or more of the instructions included within the block of instructions, then monitoring circuitry 1520 is set accordingly. At the end of the iteration, profile register 1530 is set according to monitoring circuitry 1520. During remaining iterations of the block of instructions, AND gate 1532 inhibits propagation of signals through partition 1500, thereby reducing power consumption, in response to profile signal 1531 if partition 1500 was not used during the first iteration of the block of instructions. One skilled in the art will recognize that AND gate 1532 is merely representative of circuitry for inhibiting partition 1500. Various embodiments of inhibiting circuitry are readily derived by one skilled in the art to embody aspects of the present invention.

Figure 16:
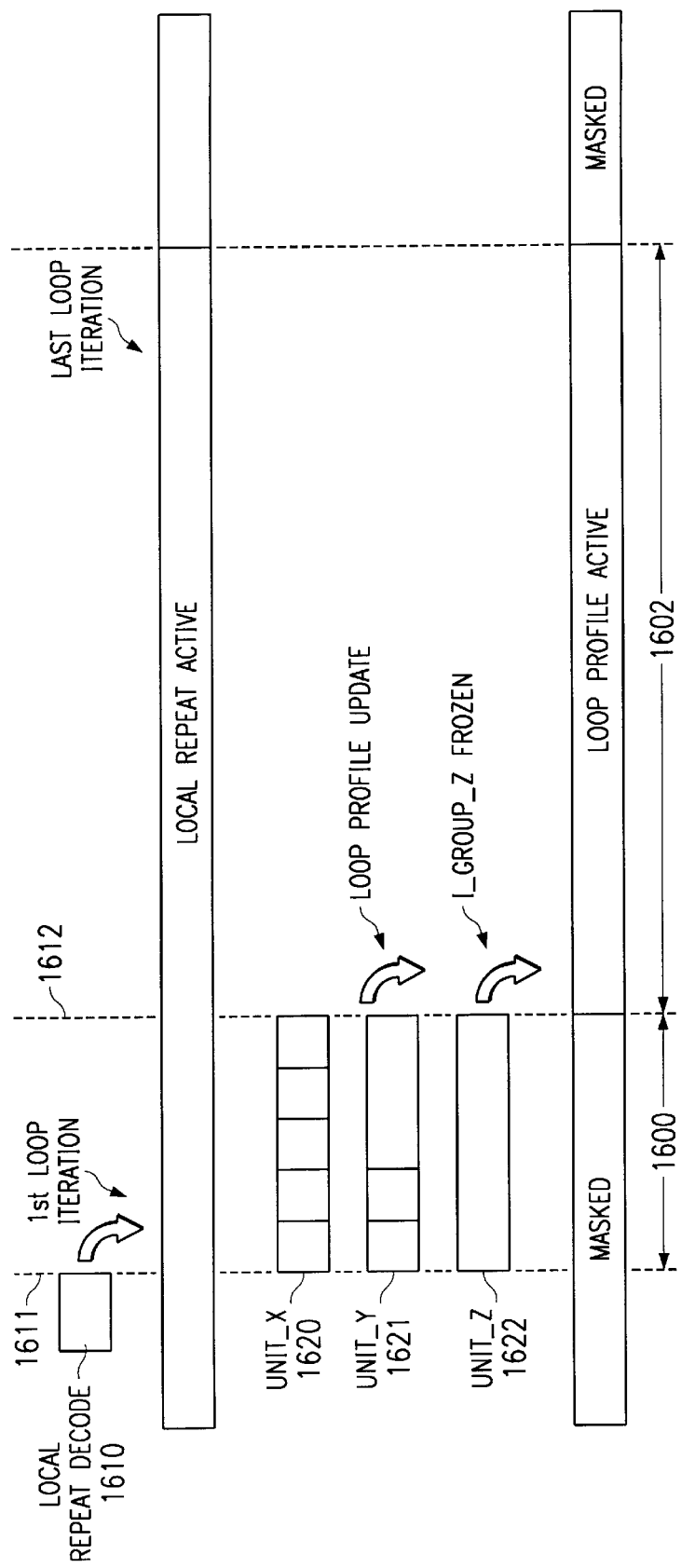
FIG. 16 is a timing diagram illustrating operation of the monitoring circuitry of FIG. 15 during execution of a block of instructions by the processor.

FIG. 16 is a timing diagram illustrating operation of the monitoring circuitry of FIG. 15 during execution of a block of instructions by the processor. During time slot 1600, the first iteration of the block of instructions is performed. FIG. 16 illustrates operation of three hardware partitions, for simplicity, unit_x at 1620, unit_y at 1621, and unit_z at 1622. Shaded areas of 1620 and 1621 indicate that unit_x and unit_y are used by one or more of the instructions in the block of instructions during the first iteration. However, no shading in 1622 indicates that unit_z was not used during the first iteration. Therefore, setting of the monitoring circuitry at the end of the first iteration determines that unit_x and unit_y are needed, but unit_z is not needed. At time 1612, the repeat profile register is set with a profile parameter in response to the monitoring circuitry. During the remaining iterations of the block of instructions indicated by time slot 1602, unit_z is inhibited in response to the profile parameter to reduce power consumption.

Referring again to FIGS. 4 and 10, there are several other portions of processor 100 that can be partitioned and selectively inhibited during repetitive execution of a block of instructions in order to further reduce power consumption. For example, in one embodiment, the profile can indicate if the loop body includes instructions performing an initialization in the ADDRESS pipeline slot or a swap in the register file. The associated hardware (not shown) can be frozen during the entire loop execution.

In another embodiment, the profile can indicate if the loop body includes instructions involving the data coefficient pointer. The associated hardware (not shown) can be frozen during the entire loop execution.

In another embodiment, if the loop requires only two address generators out of the three included in address unit 110, then the unneeded address generator can be inhibited.

In another embodiment, if the algorithm doesn't care about status update then the status update circuitry (not shown) can be inhibited during execution of the block repeat.

In another embodiment, if it is determined that no instruction parallelism can be taken advantage of during execution of the block of instructions, then instruction register 806 and all associated control circuitry can be inhibited. Similarly, in a VLIW architecture where up to six to eight instructions can be dispatched per cycle, for example, it is not always possible to fully take advantage of such parallelism during repetitive execution of a block of instructions. A local repeat profile can advantageously provide a mean to adjust the hardware according to the execution needs. For instance, if within the loop the maximum number of parallel instructions is four, then the profile can pass this information before loop execution in order to freeze useless hardware.

The same approach can be applied for data format. The processor support different data types: 8-bit, 16-bit, 32-bit, and dual 16-bit. Other embodiments may support floating point, for example. The datapath is partitioned as slices and only the data path partitions required by the block of instruction are allowed to be active during repetitive execution of the block of instructions.

Figure 17:
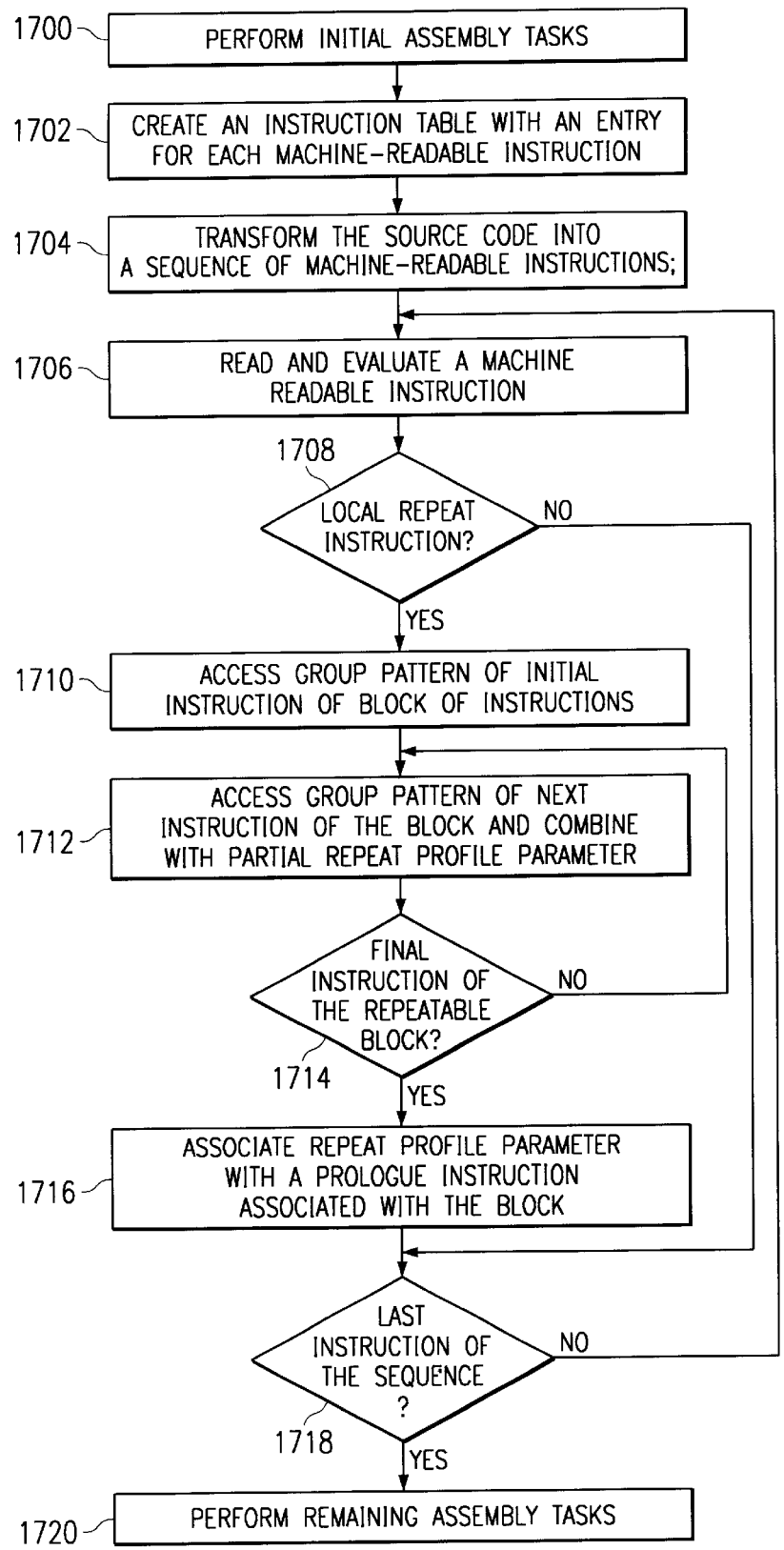
FIG. 17 is a flow chart illustrating various steps involved for forming a repeat profile parameter by an assembler by determining what partitions will be needed during execution of a block of instructions.

FIG. 17 is a flow chart illustrating various steps involved for forming a repeat profile parameter by an assembler by determining what partitions will be needed during execution of a block of instructions. In step 1700, initial assembly tasks are performed. As used herein, the term "assembler" means any means for converting human readable programs into machine readable instruction sequences, including compiling and incremental compilation, for example. Assembler operation in general is known and will not be described further herein. In step 1702, a table is created which has an entry for each machine readable instruction executable format. Each entry includes a pattern that indicates which selectable hardware partitions are required for execution of the associated instruction. For example, the pattern may indicate a particular instruction group that corresponds to a partition in the instruction decoder. The pattern may indicate instruction length, address mode, etc, depending on the selected processor and the hardware partitioning supported by that processor.

In step 1704, the source code is transformed into a sequence of machine readable instructions using known compilation/assembly techniques. In steps 1706 and 1708, each machine readable instruction is examined to determine if it is a repeat instruction. Once a repeat instruction is located, then in step 1710 an initial instruction for the block of instruction associated with the repeat instruction is identified and a group pattern for the initial instruction is accessed and used as an initial profile parameter. In steps 1712 and 1714, each subsequent instruction of the block is examined and a group pattern associated with each is combined with the initial repeat profile parameter; Once the final instruction of the block of instructions is examined and its group pattern included in the profile parameter, the profile parameter is associated with a prologue instruction associated with the block of instructions. In a preferred embodiment, the profile parameter is appended to the repeat instruction as shown in Table 2.

In step 1718, the process continues and additional blocks of instructions and associated profile parameters are formed until the sequence of machine readable instructions is completely processed. In step 1720 the assembly process is completed, using known assembly techniques. The completed assembly process provides a sequence of machine readable instructions in which each repeatable block of instructions has a prologue instruction, such as a repeat instruction, with an appended repeat profile parameter.

Figure 18:
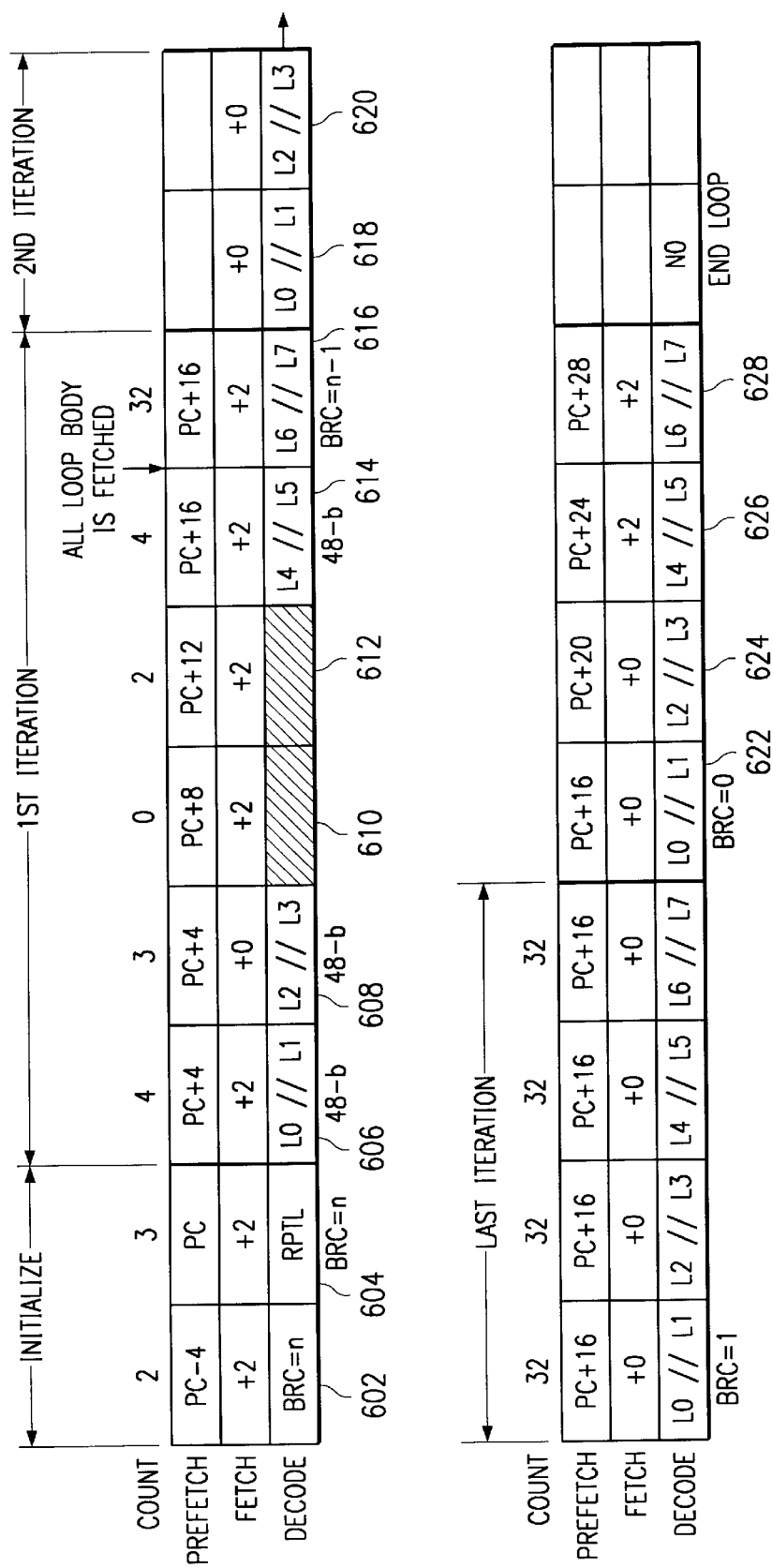
FIG. 18 is a timing diagram illustrating execution of a local loop instruction in the instruction execution of the pipeline of the processor.

Referring now to FIG. 18 and with reference to FIG. 5, the local loop instruction flow for the preferred embodiment will be described in more detail. The local loop repeat is set up by initializing a Block Repeat Count (BRC0/BRC1), shown in the DECODE stage in a first pipeline slot 602, with the number of iterations of the local loop, and then in the next slot 604 the local loop instruction (RPTL) itself is decoded. The BRC0/BRC1 is decremented for each repeat of the last instruction of the loop if BRC0 (or respectively BRC1) is not zero. It will be evident to a skilled person that optionally the local loop repeat may be set up by defining a maximum iteration value, and initializing a counter to zero. The counter can then be incremented for each repeat of the last instruction of the loop. The decrement or increment may be in steps other than one. During slots 602 and 604, the Program Counter increases by four bytes to a value "PC", and two further instruction words are fetched into the IBQ 502, thus two instruction words per slot 602, 604 are fetched into IBQ 502. In slot 602 the number of words 504 available in the IBQ 502 is 2, and is shown labeled Count in FIG. 18. The number of words available in the IBQ 502 is given by the difference between the LRPC 536 and the LWPC 532, since they respectively point to the currently dispatched instruction and the location for writing the next instruction into the IBQ 502. Since, for the purposes of this embodiment, the instruction which initializes the BRC0/BRC1 is a one word 16-bit instruction, for example and BRC0/BRC1=DAx comprises no parallelism, only the 16-bit initialization instruction is dispatched to the first or second instruction decoder 512, 514 in slot 602.

For the next slot 604, the WPC increases by four to a value "PC" and a further 2×16-bit instruction words 504 are fetched in the IBQ 502. The number of instruction words 504 available in the IBQ 502 is now 3, since only the 1 word instruction initializing BRC0/BRC1 was dispatched during the previous slot 602.

The first iteration of the local, loop begins at slot 606, where a first parallel pair of instructions $L_0$, $L_1$ are dispatched to the decoders 512, 514. The number of instruction words 504 which are available in the IBQ 502 is now 4. This is because in the present embodiment the local loop instruction is only a 16-bit instruction and therefore only one word 504 was dispatched to the decoder 512 during the previous slot 604.

In order to optimize the execution of the local loop, the instructions are executed in parallel so far as is possible. In the present example, it is assumed that all instructions comprising the body of the loop are executable in parallel. This results in two unused slots, 610, 612 during the first pass of the body of the loop, but leads to greater speed for the rest of the iterations.

Additionally, for the present example instructions $L_0$, $L_1$ are executable in parallel and comprise a total of 48 bits, thus 3 instruction words 504 are dispatched to the decoders 512, 514 for each decode stage. For the start of the repeat block, cycle 606, two instructions $L_0$ and $L_1$ are dispatched to the decoders and the difference between the LRPC 536 and the LWPC 532 is 4. In cycle 608 a further two instruction words are fetched into the IBQ, but three words are dispatched.

The LRPC 536 now moves 3 words along the IBQ 502, and the LWPC 532 moves two words along the IBQ 502 to the next fetch location. Thus, the difference between LWPC 532 and LRPC 536 is decreased by one to three for the next slot 608. Again, assuming the next two instructions $L_2$, $L_3$ are executable in parallel and comprise a total of 48 bits the LRPC 532 moves 3 words along the IBQ 502 ready for the next slot 610. The program pre-fetch is halted for one slot, in this case slot 608, and therefore no instruction words are loaded into the IBQ 502 for this slot. Thus, for slot 610 the LRPC 536 and LWPC 532 point to the same IBQ 502 address, and Count=0. Since there are no available bits for dispatch in the IBQ 502, slot 610 is an unused slot for decoding. However, two instruction words are fetched into the IBQ 502 during slot 610 moving LWPC 532 along IBQ by two words, and therefore there are two instruction words available for slot 612. However, if the next two instructions, $L_4$, $L_5$, are parallel instructions comprising 48 bits then there is no dispatch in slot 612, and there is a further unused slot.

For slot 614 there are a total of four instruction words 504 available in the IBQ 502, and instructions $L_4$, $L_5$, comprising 48 bits are dispatched to decoders 512, 514. A further two instruction words 504 are fetched into the IBQ 502 during slot 614. The WPC has now increased by 16 packets of 2×instruction words 504, and thus the IBQ 502 is full and all the loop body has been fetched. Thus, as can be seen, the WPC count for slot 616 remains at PC+16 for the Pre-Fetch, although a further two words 504 are fetched into the IBQ 502 originating from the pre-fetch of slot 614.

For slot 616 the body of the loop has been fetched into the IBQ 502, and there are 32 words available in the IBQ. This is the maximum size of the IBQ 502, and hence the fetch is switched off for further slots 618, 620 onwards forming further iterations of the loop.

For the last iteration of the loop, the fetch is switched back on in slot 626 in order to top up the IBQ 502 to avoid any gaps in the queue.

Thus, for the body of the loop, excluding the first and last iteration there is no pipeline fetch stage. Thus, there is no program memory access. This reduces power consumption during the loop compared to conventional loops, since fewer program memory accesses are performed.

Thus, in accordance with an embodiment of the invention, the microprocessor is configured to respond to a local repeat instruction which provides for an iterative looping through a set of instructions all of which are contained in the Instruction Buffer Queue 502. Referring again to FIG. 5, the IBQ 502 is 64 bytes long and is organised into 32×16 bit words. Instructions are fetched into IBQ 502 two words at a time. Additionally, the Instruction Decoder Controller reads a packet of up to six program code bytes into the instruction decoders 512 and 514 for each Decode stage of the pipeline. The start and end of the loop, i.e. first and last instructions, may fall at any of the byte boundaries within the four byte packet of program code fetched to the IBQ 502. Thus, the start(first) and end(last) instructions are not necessarily co-terminous with the top and bottom of IBQ 502. For example, in a case where the local loop instruction spans two bytes across the boundary of a packet of four program codes, both the packet of four program codes must be retained in the IBQ 502 for execution of the local loop repeat. In order to take this into account the local loop instruction offset is a maximum of 55 bytes.

During the first iteration of a local loop, the program code for the body of the loop is loaded into the IBQ 502 and executed as usual. However, for the following iterations no fetch will occur until the last iteration, during which the fetch will restart.

Another embodiment the microprocessor is configured to align instruction words in the IBQ 502 in order to maximize the block size for a local loop. The alignment of the instruction words may operate to place start and end instructions for a local loop as close to respective boundaries of the IBQ 502 as possible. An embodiment of the assembler configures the alignment of instructions in the IBQ 502 to maximize the block size for a local loop.

Referring again to FIG. 1, fabrication of data processing device 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries that are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism.

Partitioning of the instruction decoder for several instruction groups allows one or more of the decoder partitions to remain idle during execution of an instruction loop. Consequently, there is a corresponding reduction in power consumption by the microprocessor. Advantageously, partitioning of other portions of the processor and inhibiting operation of selected partitions further reduces power consumption of the processor.

In view of the foregoing description it will be evident to a person skilled in the art that various modifications may be made within the scope of the invention. For example, the instructions comprising the body of the loop need not be full 48-bit parallel instructions, or even parallel instructions at all. Additionally, the loop need not take up all of the IBQ, but may be smaller than that described above. In another embodiment, an IBQ is not provided. In another embodiment, the program memory comprises a memory cache. In alternative embodiments, the instruction decoder may be partitioned across a number of pipeline stages, or be included completely within one pipeline stage.

Advantageously, aspects of the present invention may be combined with other techniques for power management within a processor to further reduce power consumption of a processor. For example, various functional units may be placed in a standby mode during loop execution if a functional unit is not used by any of the instructions in the loop.

The scope of the present disclosure includes any novel feature or combination of features disclosed therein either explicitly or implicitly or any generalization thereof irrespective of whether or not it relates to the claimed invention or mitigates any or all of the problems addressed by the present invention.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, various portions of the processor can be partitioned into a set of partitions, as described herein. In a given embodiment, any one or more sets of partitions can be provided and controlled by a single or by multiple repeat profile parameters. It is therefore contemplated that the appended claims will cover any such modifications of the embodiments as fall within the true scope and spirit of the invention.

What is claimed is:

1. A method for operating a digital system comprising a microprocessor having at least one portion partitioned into a plurality of partitions, wherein the method comprises the steps of:

fetching a sequence of instructions within an instruction pipeline of the microprocessor into an instruction buffer;

detecting a local block of instructions within the fetched sequence of instructions in the instruction buffer, wherein the local block comprises a local repeat instruction;

associating, with the local repeat instruction, a repeat profile parameter indicative of partition that is unneeded for the execution of the local block of instructions;

repetitively executing first and subsequent instances of the local block of instructions; and for subsequent instances of the repetitively executing step, inhibiting operation of the at least one unneeded partition for the subsequent instances of the repetitively executing step responsive to the repeat profile parameter.

2. The method of claim 1, further comprising:

storing the repeat profile parameter in a repeat profile parameter register;

wherein the inhibiting operation comprises applying control signals, corresponding to the contents of the repeat profile parameter register, to the partitioned portion of the microprocessor.

3. The method of claim 1, wherein the partitioned portion of the microprocessor comprises an instruction decoder, such that each partition of the instruction decoder is associated with a group of instructions;

wherein the repeat profile parameter is indicative of at least a first group of instructions not contained within the local block of instructions; and wherein the inhibiting step inhibits at least one partition of the instruction decoder corresponding to the first group of instructions.

4. The method of claim 3, wherein the inhibiting step comprises inhibiting a first partition of the instruction decoder associated with a first stage of the pipeline and inhibiting a second partition of the instruction decoder associated with a second stage of the instruction pipeline.

5. The method of claim 1, wherein the partitioned portion of the microprocessor comprises an instruction decoder, such that each partition of the instruction decoder is associated with a group of instructions;

further comprising:

identifying a group of instructions that are inherently forbidden from being executed during repetitive execution of the local block of instructions;

and wherein the inhibiting step comprises inhibiting operation of a partition of the instruction decoder corresponding to the forbidden group of instructions during subsequent instances of the repetitively executing step while a remainder of the instruction decoder decodes instructions in the local block of instructions.

6. The method of claim 1, wherein the partitioned portion comprises an instruction register of the microprocessor, partitioned in accordance with different instruction lengths;

wherein the retrieved repeat profile parameter indicates a maximum instruction length of instructions within the local block of instructions; and wherein the step of inhibiting comprises inhibiting loading of one or more of the instruction register partitions in accordance with the maximum instruction length.

7. The method of claim 1, wherein the partitioned portion comprises the instruction pipeline, partitioned in accordance to parallel instruction execution;

wherein the retrieved repeat profile parameter indicates a maximum instruction parallelism of instructions within the local block of instructions; and wherein the step of inhibiting comprises inhibiting one or more parallel instruction execution partitions.

8. The method of claim 1, wherein the partitioned portion comprises a portion of the microprocessor, partitioned in accordance to data types;

wherein the retrieved repeat profile parameter indicates one or more data types not used within the local block of instructions; and wherein the step of inhibiting comprises inhibiting one or more data type partitions.

9. The method of claim 1, wherein the repeat profile parameter indicates that updating of status circuitry is not required within the block of instructions; and wherein the step of inhibiting comprises inhibiting updating of the status circuitry.

10. The method of claim 1, wherein the partitioned portion comprises address generation circuitry of the microprocessor, partitioned into a plurality of partitions accordance to address modes;

wherein the repeat profile parameter indicates one or more address modes not used within the local block of instructions; and wherein the step of inhibiting comprises inhibiting one or more address generation partitions.

11. The method of claim 1, wherein the associating step comprises associating the repeat profile parameter with a prologue instruction for the local block;

and further comprising:

retrieving the repeat profile parameter prior to the first instance of the repetitively executing step; and inhibiting operation of the at least one unneeded partition during the first instance of the repetitively executing step responsive to the repeat profile parameter.

12. The method of claim 1, wherein the associating step comprises:

in the first instance of the repetitively executing step, monitoring execution of the block of instructions to determine partitions of the portion of the microprocessor that are unneeded in the execution of the local block of instructions; and then storing a repeat profile parameter corresponding to the result of the monitoring step.

13. The method of claim 1, wherein the local block of instructions comprises an inner loop nested within an outer loop;

and further comprising:

associating a first repeat profile parameter with the inner loop and associating a second repeat profile parameter with the outer loop; and retrieving the first repeat profile parameter during execution of the inner loop and retrieving the second repeat profile parameter of the outer loop;

and wherein the step of inhibiting comprises inhibiting operation of a first partition of the microprocessor during execution of the inner loop, and inhibiting operation of a second partition of the microprocessor during execution of the outer loop.

14. The method of claim 1, further comprising the steps of:

interrupting the repetitively executing step to execute an interrupt service routine (ISR);

masking partition inhibition so that all partitions of the microprocessor are enabled;

executing the ISR; and then unmasking partition inhibition and returning to the repetitively executing step.

15. The method of claim 14 wherein the step of masking partition inhibition comprises masking the repeat profile parameter.

16. The method of claim 11, further comprising the step of assembling a source code program to create the sequence of instructions comprising the block of instructions, the prologue instruction and the associated repeat profile parameter, wherein the step of assembling comprises the steps of:

creating an instruction table with an entry for each instruction executable by a selected microprocessor, such that the entry for each instruction includes a group pattern defining a group of instructions that includes that instruction;

transforming the source code into a sequence of instructions;

determining the initial instruction and the final instruction for the repeatable block of instructions associated with the prologue instruction;

combining a plurality of group patterns selected from the instruction table representative of each instruction in the block of instructions to form a repeat profile parameter; and associating the repeat profile parameter with the prologue instruction.

17. A digital system comprising a pipelined microprocessor, wherein the microprocessor comprises:

an instruction buffer comprising a plurality of instruction buffer registers for storing a plurality of instructions;

an instruction decoder for decoding instructions received from the instruction buffer, the instruction decoder being controllably connected in a pipeline, wherein the instruction decoder is partitioned into a plurality of partitions according to a respective plurality of instruction groups, at least one of the partitions and operable to inhibit decoding of instructions responsive to an inhibit input; and block repeat control circuitry for storing a repeat profile parameter associated with a local repeat instruction, the local repeat instruction corresponding to a block of instructions stored in the instruction buffer that are to be repetitively executed, and for selectively asserting the inhibit input to at least one of the partitions of the instruction decoder responsive to the repeat profile parameter indicating that a local block of instructions corresponds to an instruction group not decoded by the at least one of the partitions.

18. The digital system of claim 17, wherein the block repeat control circuitry comprises a repeat profile register for storing the repeat profile parameter, the repeat profile circuitry coupled to the inhibit input of the at least one instruction decoder partition.

19. The digital system of claim 17, wherein the instruction decoder is hierarchical, such that a first portion of the instruction decoder is associated with a first stage of the pipeline and a second portion of the instruction decoder is associated with a second stage of the pipeline; and wherein at least a first instruction decoder partition in the first portion of the instruction decoder has a first inhibit input connected to a first output of the repeat profile circuitry and at least a second instruction decoder partition in the second portion of the instruction decoder has a second inhibit input connected to a second output of the repeat profile circuitry.

20. The digital system of claim 17, wherein the repeat profile register is for storing a repeat profile parameter provided by a prologue instruction of the local block of instructions.

21. The digital system of claim 17, wherein the repeat profile register is for storing a repeat profile parameter provided by monitoring circuitry coupled to the instruction decoder, wherein the monitoring circuitry is operable to monitor the instruction decoder during a first iteration of a first local block of instructions and to thereby derive a first repeat profile parameter indicative of a least a first group of instructions not included within the first local block of instructions.

22. The digital system of claim 17, wherein the repeat profile register is for storing two repeat profile parameters representative of an inner local loop and an outer local loop, such that the instruction decoder is operable to inhibit decoding of a first instruction group during execution of the inner local loop and to inhibit decoding of a second instruction group during execution of the outer local loop.

23. The digital system of claim 17, wherein the pipeline comprises an instruction fetch stage for fetching instructions from a program memory for transfer into the instruction buffer; and wherein the block repeat control circuitry is operable to inhibit the instruction fetch stage subsequent to fetching the final instruction of the local block of instructions from the program memory into the instruction buffer.

24. The digital system of claim 17, wherein the instructions are of a variable length; and wherein the instruction register is operable to be partially inhibited in response to the repeat profile circuitry during execution of the local block of instructions.

25. The digital system of claim 17 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

* * * * *